United States Patent
Jenson et al.

(10) Patent No.: US 8,326,858 B2
(45) Date of Patent: Dec. 4, 2012

(54) SYNCHRONIZATION OF FIXED AND MOBILE DATA

(75) Inventors: Scott Jenson, Edina, MN (US); Leland Rechis, Brooklyn, NY (US); Yael Shacham, San Francisco, CA (US)

(73) Assignee: Google Inc., Mountain View, CA (US)

( * ) Notice: Subject to any disclaimer, the term of this patent is extended or adjusted under 35 U.S.C. 154(b) by 1155 days.

(21) Appl. No.: 11/624,189

(22) Filed: Jan. 17, 2007

(65) Prior Publication Data

US 2008/0172373 A1 Jul. 17, 2008

(51) Int. Cl.
*G06F 7/10* (2006.01)
*G06F 17/30* (2006.01)
*G06F 15/16* (2006.01)
*G06F 12/00* (2006.01)

(52) U.S. Cl. ........................................ 707/766; 707/784

(58) Field of Classification Search .................. 707/766
See application file for complete search history.

(56) References Cited

U.S. PATENT DOCUMENTS

| | | | |
|---|---|---|---|
| 5,263,157 A | 11/1993 | Janis | |
| 5,949,413 A | 9/1999 | Lerissa et al. | |
| 5,983,221 A | 11/1999 | Christy | |
| 6,023,708 A | 2/2000 | Mendez et al. | |
| 6,324,544 B1 | 11/2001 | Alam et al. | |
| 6,356,905 B1 | 3/2002 | Gershman et al. | |
| 6,393,423 B1 | 5/2002 | Goedken | |
| 6,484,162 B1 | 11/2002 | Edlund et al. | |
| 6,610,105 B1 | 8/2003 | Martin, Jr. et al. | |
| 6,633,915 B1 * | 10/2003 | Hashimoto | ................ 709/228 |
| 6,715,131 B2 | 3/2004 | Martin, Jr. et al. | |
| 6,738,766 B2 | 5/2004 | Peng | |
| 6,769,130 B1 | 7/2004 | Getsin et al. | |
| 6,816,944 B2 | 11/2004 | Peng | |
| 6,941,383 B1 | 9/2005 | Getsin et al. | |
| 6,944,621 B1 | 9/2005 | Collart | |
| 6,944,661 B2 | 9/2005 | Moore et al. | |
| 6,996,798 B2 | 2/2006 | Ali et al. | |
| 7,003,284 B2 | 2/2006 | Schwartz et al. | |
| 7,043,521 B2 | 5/2006 | Eitel | |
| 7,043,685 B2 | 5/2006 | Azuma | |
| 7,047,499 B2 | 5/2006 | Ferri | |

(Continued)

FOREIGN PATENT DOCUMENTS

EP 1 420 550 5/2004

(Continued)

OTHER PUBLICATIONS

Chitu, Alex, "Google Reader Mobile", May 19, 2006.*

(Continued)

*Primary Examiner* — Bin Van Ho
(74) *Attorney, Agent, or Firm* — Fish & Richardson P.C.

(57) ABSTRACT

A computer-implemented method for coordinating web-based content between networked computing devices is disclosed. The method includes associating an identifier with a first remote device without connecting the identifier to a registered user account, receiving from the first remote device a request to modify a web page, receiving a log-in from a registered user and associating the log-in with the first remote device after receiving the request to modify a first personalized web page, and associating the request to modify a web page with a first personalized home page associated with the registered user, and modifying the first personalized home page.

19 Claims, 16 Drawing Sheets

U.S. PATENT DOCUMENTS

| | | | |
|---|---|---|---|
| 7,117,239 B1 | 10/2006 | Hansen | |
| 7,149,792 B1 | 12/2006 | Hansen et al. | |
| 7,162,473 B2 | 1/2007 | Dumais et al. | |
| 7,162,494 B2 | 1/2007 | Arellano | |
| 7,165,105 B2 | 1/2007 | Reiner et al. | |
| 7,178,106 B2 | 2/2007 | Lamkin et al. | |
| 7,178,149 B2 | 2/2007 | Hansen | |
| 7,181,488 B2 | 2/2007 | Martin et al. | |
| 7,185,014 B1 | 2/2007 | Hansen | |
| 7,188,193 B1 | 3/2007 | Getsin et al. | |
| 7,219,139 B2 | 5/2007 | Martin et al. | |
| 7,228,493 B2 | 6/2007 | Kosak et al. | |
| 7,251,687 B1 | 7/2007 | McCullough | |
| 7,269,634 B2 | 9/2007 | Getsin et al. | |
| 7,281,042 B2 | 10/2007 | Hsu | |
| 7,287,251 B1 | 10/2007 | Mensching et al. | |
| 7,318,056 B2 | 1/2008 | Taniguchi et al. | |
| 7,346,843 B2 | 3/2008 | Hind et al. | |
| 7,346,920 B2 | 3/2008 | Lamkin et al. | |
| 7,376,640 B1 | 5/2008 | Anderson et al. | |
| 7,379,661 B2 | 5/2008 | Lamkin et al. | |
| 7,392,481 B2 | 6/2008 | Gewickey et al. | |
| 7,444,319 B1 | 10/2008 | Sathyanarayan | |
| 7,448,021 B1 | 11/2008 | Lamkin et al. | |
| 7,454,515 B2 | 11/2008 | Lamkin et al. | |
| 7,458,091 B1 | 11/2008 | Getsin et al. | |
| 7,487,499 B2 | 2/2009 | Gatz | |
| 7,499,938 B2 | 3/2009 | Collart | |
| 7,505,992 B2 | 3/2009 | Collart | |
| 7,536,408 B2 | 5/2009 | Patterson | |
| 7,567,959 B2 | 7/2009 | Patterson | |
| 7,577,677 B2 | 8/2009 | Collart | |
| 7,580,921 B2 | 8/2009 | Patterson | |
| 7,580,929 B2 | 8/2009 | Patterson | |
| 7,584,175 B2 | 9/2009 | Patterson | |
| 7,584,223 B1 | 9/2009 | Pinkas | |
| 7,587,486 B2 | 9/2009 | Taniguchi | |
| 7,599,914 B2 | 10/2009 | Patterson | |
| 7,603,345 B2 | 10/2009 | Patterson | |
| 7,617,164 B2 | 11/2009 | Burges et al. | |
| 7,624,103 B2 | 11/2009 | Wiegering et al. | |
| 7,650,342 B2 | 1/2010 | Sugiyama et al. | |
| 7,676,505 B2 | 3/2010 | Chess et al. | |
| 7,689,510 B2 | 3/2010 | Lamkin et al. | |
| 7,689,615 B2 | 3/2010 | Burges et al. | |
| 7,693,863 B2 | 4/2010 | Martin et al. | |
| 7,702,618 B1 | 4/2010 | Patterson | |
| 7,711,256 B2 | 5/2010 | Wun | |
| 7,711,679 B2 | 5/2010 | Patterson | |
| 7,711,795 B2 | 5/2010 | Getsin et al. | |
| 7,716,158 B2 | 5/2010 | McConnell | |
| 7,720,723 B2 | 5/2010 | Dicker et al. | |
| 7,743,046 B2 | 6/2010 | Anand et al. | |
| 7,756,890 B2 | 7/2010 | Carter | |
| 7,765,206 B2 | 7/2010 | Hillis et al. | |
| 7,809,740 B2* | 10/2010 | Chung et al. | 707/758 |
| 2003/0004984 A1 | 1/2003 | Chou | |
| 2004/0162830 A1 | 8/2004 | Shirwadkar et al. | |
| 2005/0164691 A1 | 7/2005 | Payne | |
| 2005/0228775 A1* | 10/2005 | Nilsen et al. | 707/2 |
| 2006/0184512 A1 | 8/2006 | Kohanim | |
| 2006/0230021 A1* | 10/2006 | Diab et al. | 707/3 |
| 2006/0271520 A1 | 11/2006 | Ragan | |
| 2007/0130518 A1* | 6/2007 | Shavit et al. | 715/530 |
| 2007/0157119 A1 | 7/2007 | Bishop | |
| 2007/0180380 A1 | 8/2007 | Khavari et al. | |
| 2007/0206221 A1* | 9/2007 | Wyler et al. | 358/1.15 |
| 2008/0016055 A1 | 1/2008 | Riise et al. | |
| 2008/0016462 A1 | 1/2008 | Wyler et al. | |
| 2008/0072139 A1 | 3/2008 | Salinas et al. | |
| 2008/0168052 A1 | 7/2008 | Ott et al. | |
| 2008/0172357 A1* | 7/2008 | Rechis et al. | 707/2 |
| 2008/0172362 A1* | 7/2008 | Shacham et al. | 707/3 |
| 2008/0172372 A1* | 7/2008 | Shacham et al. | 707/5 |
| 2008/0200161 A1 | 8/2008 | Morse et al. | |
| 2008/0215557 A1 | 9/2008 | Ramer et al. | |

FOREIGN PATENT DOCUMENTS

| | | |
|---|---|---|
| JP | 2005-346734 | 12/2005 |
| WO | 2005/066831 | 7/2005 |

OTHER PUBLICATIONS

Chite, Alex, "Google Reader Mobile", May 19, 2006.*

"Google Personalized Home for Mobile Devices", Jan. 12, 2006.*

International Preliminary Report on Patentability for Application No. PCT/US2008/051349, dated Jul. 30, 2009, 7 pages.

International Search Report & Written Opinion, PCT/US2008/051349, mailed May 20, 2008, 11 pages.

Hattori, Shun, Taro Tezuka, and Katsumi Tanaka. "Activity-Based Query Refinement for Context-Aware Information Retrieval." Department of Social Informatics, Kyoto University, 2006 (4 pages).

Hattori, Shun, Taro Tezuka, and Katsumi Tanaka. "Context-Aware Query Refinement for Mobile Web Search." Department of Social Informatics, Kyoto University, 2007 (4 pages).

"Add to Google—Information for Publishers" Internet [Online] Apr. 17, 2006, pp. 1-3, Retrieved from the Internet: URL:http://web.archive.org/web/20060417215725/http://www.google.com/webmasters/add.html> [retrieved on Jun. 19, 2008].

"Can I personalized my Google homepage without signing in:" INTERNET [Online] May 7, 2006, pp. 1-1, Retrieved from the Internet: URL:http://web.archive.org/web/20060507033243/www.google.com/support/bin/answer.py?answer=31721&topic=1592> [retrieved on Jun. 19, 2008].

European Communication Pursuant to Article 94(3) EPC for Application No. EP 08 705 988.7-2201, dated Oct. 8, 2010, 7 pages.

International Preliminary Report on Patentability for Application No. PCT/US2008/051363, dated Jul. 30, 2009, 10 pages.

Fish & Richardson P.C., Amendment in Reply to Action dated Apr. 30, 2010 in U.S. Appl. No. 11/624,179, filed Jul. 22, 2010, 17 pages.

Fish & Richardson P.C., Amendment in Reply to Action dated Dec. 26, 2008 in U.S. Appl. No. 11/624,179, filed Jun. 26, 2009, 12 pages.

Fish & Richardson P.C., Amendment in Reply to Action dated Oct. 16, 2009 in U.S. Appl. No. 11/624,179, filed Jan. 22, 2010, 15 pages.

Fish & Richardson P.C., Notice of Appeal and Appeal Brief in Reply to Action dated Dec. 8, 2010 in U.S. Appl. No. 11/624,179, filed Apr. 7, 2011, 28 pages.

International Search Report & Written Opinion, PCT/US2008/051363, mailed Oct. 1, 2008, 14 pages.

Invitation to Pay Additional Fees PCT/US2008/051363, mailed Jul. 3, 2008, 7 pages.

USPTO Final Office Action in U.S. Appl. No. 11/624,179, mailed Oct. 16, 2009, 16 pages.

USPTO Final Office Action in U.S. Appl. No. 11/624,179, mailed Dec. 8, 2010, 18 pages.

USPTO Non-Final Office Action in U.S. Appl. No. 11/624,179, mailed Dec. 26, 2008, 12 pages.

USPTO Non-Final Office Action in U.S. Appl. No. 11/624,179, mailed Apr. 30, 2010, 19 pages.

Chitu, Alex. "Google Operating System: Unofficial News and Tips About Google." May 19, 2006 [Retrieved on Jan. 19, 2012]. Retrieved from the Internet http://googlesystem.blogspot.com/2006/05/google-reader-mobile.html (1 page).

European Search Report for Application No. EP 08713807.9-1527/2122859, dated Jan. 30, 2012, 3 pages.

Google. "News from Google: Google Personalized Home for Mobile Devices." Jan. 12, 2006 [Retrieved on Jan. 19, 2012]. Retrieved from the Internet <URL: http://www.google.com/intl/en/press/annc/p_home_mobile.html> (2 pages).

Sah, Adam. "More feeds for speed." The Official Google Blog, Apr. 3, 2006. Retrieved from the Internet <URL: http://googleblog.blogspot.com/2006/04/more-feeds-for-speed.html>.

* cited by examiner

FIG. 8D

SYNCHRONIZATION OF FIXED AND MOBILE DATA

TECHNICAL FIELD

This document discusses personalization of on-line content delivery.

BACKGROUND

As mobile devices such as cellular telephones and personal digital assistants become more powerful and are provided with much better graphics, users of mobile devices are seeking to receive richer experiences from their devices. Where once simple telephone access and text messaging were enough, users now seek more features. Mobile devices, for example, can support web browsers that provide access for web browsing (albeit in a slightly reduced size from fixed, desktop computers), and to particular web sites designed for mobile view (e.g., authored in WML or xHTML).

However, mobile devices do not always lend themselves to the same uses as full-featured fixed devices such as desktop personal computers. For example, large images may be very helpful and beautiful on a large desktop display, but they are generally not useful on mobile devices because they lose their resolution or require extensive panning. In addition, many mobile devices do not have the same features as fixed systems, such as the ability to play Flash animations, handle JavaScript, or handle other newer technologies as they emerge. Mobile devices are also generally different with respect to inputting information. In particular, they generally do not have full keyboards, so that data input can be difficult (especially when lots of data needs to be entered). In addition, it is often necessary to operate mobile devices with a single hand, and sometimes using nothing more than a thumb for data input.

In addition, users typically have different needs with mobile devices than they do with devices at home or work. For example, mobile users are often looking for particular information that they need right away, and do not use their mobile devices for in depth research or lengthy web browsing, which a user may do more on a desktop PC. For convenience, the needs of mobile users may be classified into three groups for examination: the "daily now," the "urgent now," and the "bored now." The daily now references repetitive queries, performed on a frequent and even daily basis, such as questions about weather, traffic, and stock prices. The urgent now references situations in which a user needs an answer right away, such as the need to get a telephone number, the location of a local business, or product prices for comparison purposes. The bored now describes a scenario in which a user needs to pass the time, such as by entertaining themselves with games, news, blogs, or browsing ring tones, while waiting at a café or for a train. It may be helpful to provide such users with devices and services that address these and similar situations, and also helpful to let such users be served well on their desktop machines and their mobile devices.

SUMMARY

This document describes systems and methods that may be employed by a user wishing to coordinate information that they access between two locations, such as between their fixed (e.g., desktop or laptop) computer and a mobile device (e.g., PDA or cell phone). In one such implementation, a user may have personal home pages that display the information that is of particular relevance to the user, presented as modules of information. For example, the user may want to see a world clock, news stories, weather, and certain blogs when they are on their main computer. They may want to see certain similar things on their mobile device, such as weather, but they may not want to see other things (such as certain blogs), and they may want to see additional things, such as bus schedules and traffic information, which are very closely tied to mobile users. The users may be provided with capabilities to edit the information that is displayed on each page (e.g., mobile page and fixed or desktop page), and to coordinate it, including during times when the users are not logged onto the system, and thus may be seen as unknown entities to the system.

In one implementation, a computer-implemented method for coordinating web-based content between networked computing devices is disclosed. The method comprises associating an identifier with a first remote device without connecting the identifier to a registered user account, receiving from the first remote device a request to modify a web page, receiving a log-in from a registered user and associating the log-in with the first remote device after receiving the request to modify a first personalized web page, and associating the request to modify a web page with a first personalized home page associated with the registered user, and modifying the first personalized home page. The identifier can include a cookie stored on the first remote device. The method may also further comprise modifying a second personalized home page associated with the registered user, wherein the first personalized home page and the second personalized home page share some or all common content.

In certain aspects, the first personalized home page can be associated with a first type of user device, and the second personalized home page can be associated with a second type of user device having display capabilities that differ from display capabilities of the first type of user device. The method may also include receiving a request associated with the registered user to modify the second personalized home page, and making a corresponding modification to the first home page. In addition, the method can include displaying on a mobile device a plurality of controls whose selection will cause a module of web content to be added to a mobile-related web page associated with the first remote device. In addition, the method may include selecting the plurality of controls for display according to popularity of each control in a region associated with the first remote device. In yet other aspects, the log-in can be received from a full-featured computer and be associated with the first remote device by causing a text message to be sent to the first remote device that directs the first remote device to a server storing the anonymous identifier and provides the server with information associated with the registered user.

In other aspects, the method may also include modifying an equivalent home page to the personalized homepage, wherein the equivalent homepage contains substantially the same topics as the personalized home page with different formatting. The personalized home page can be formatted for display on a mobile device and the equivalent homepage is formatted for display on a full-featured computer. Also, modifying the equivalent home page can comprise creating the equivalent home page and populating it with modules corresponding to modules selected for the personalized home page. The method may also include synchronizing content on the personalized home page with content on the equivalent homepage by identifying content that has been added to or deleted from one of the personalized home page and equivalent home page, and adding or deleted the corresponding content from the other home page.

In yet another implementation, a computer-implemented system is disclosed. The system includes a web page content database storing associations between session identifiers for devices of unknown users and entries corresponding to personalized web page content for the devices, a personalized web page database containing code defining web pages for registered users, a personalized home page manager to associate a registered user with a session identifier upon a log in by the registered user, and to associate entries corresponding to personalized web page content with a personalized web page associated with the registered user. The entries corresponding to personalized web page content can be generated from messages received from the devices. Also, the messages received from the devices can be delivered by a browser redirect upon selection by users of the devices of a control for adding content to a personalized page.

In some aspects, the code defining web pages for registered users comprises code defining two or more corresponding but different pages for each of a plurality of users. In addition, the personalized home page manager may be configured to associate entries corresponding to personalized web page content with the two or more corresponding but different pages for each of a plurality of users.

In yet another implementation, a computer-implemented system is disclosed. The system includes a web page content database storing associations between session identifiers for devices of unknown users and entries corresponding to personalized web page content for the devices, a personalized web page database containing code defining web pages for registered users, and means for associating entries corresponding to personalized web page content for a device with a personalized home page for a registered user.

The details of one or more embodiments are set forth in the accompanying drawings and the description below. Other features, objects, and advantages will be apparent from the description and drawings, and from the claims.

DESCRIPTION OF DRAWINGS

FIGS. 8A-8E show flow diagrams for coordinating content between different forms of personalized home pages.

Like reference symbols in the various drawings indicate like elements.

DETAILED DESCRIPTION

Figure 1A:
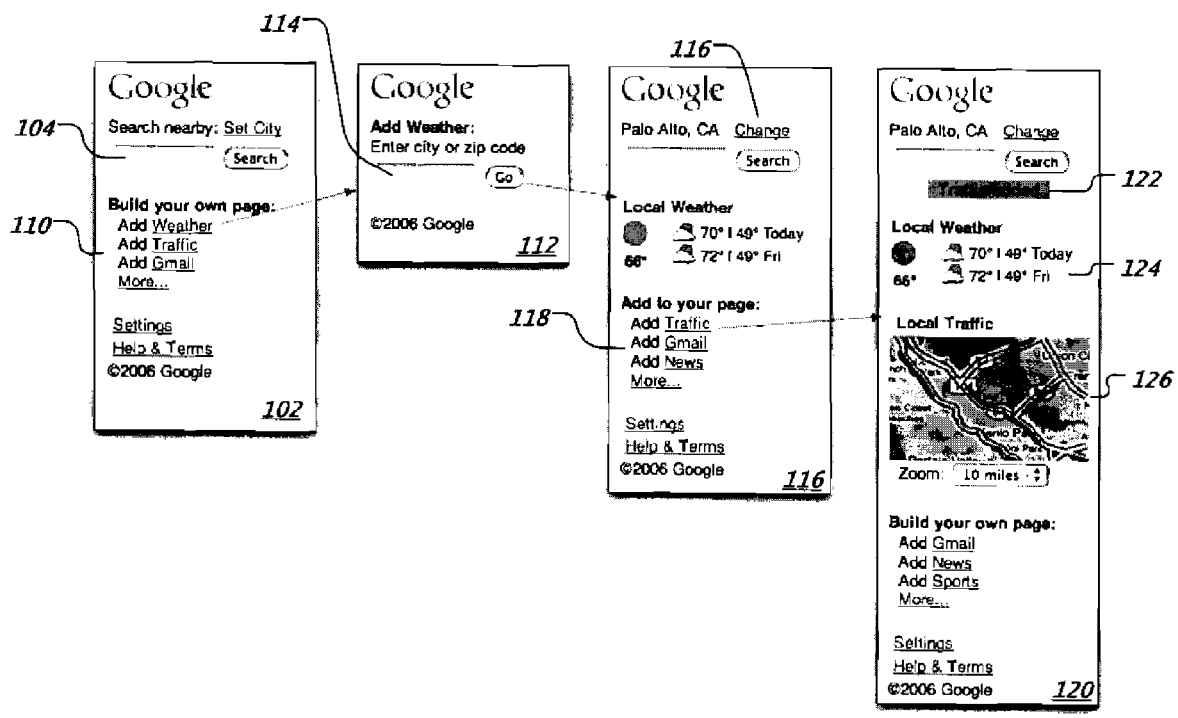
FIG. 1A shows example displays for adding modules to a personalized home page.

FIG. 1A shows example displays for adding modules to a personalized home page. In general, the pictured approach permits a user to configure a home page with relatively little work by selecting a control, such as a simple URL, and responding to any prompts that might be needed to configure the added module. In certain implementations, this approach may avoid the distraction of taking the user to a particular configuration page, and then returning the user to what they were doing before. Instead, the user may select a control and have content that is associated with that control automatically added to a personalized homepage (perhaps with some additional prompting where necessary). Such approaches avoid so-called "rounds trips" to a configuration page and then back to whatever the user was previously doing, and thus can streamline the browsing process for users.

Referring to the items in FIG. 1, a series of displays 102, 112, 116, 118 are shown. The displays 102, 112, 116, 118 show a series of displays that would be presented to someone using a web browser or similar application on a mobile device. Display 102 shows an exemplary search input page—here a page associated with the Google search engine directed to mobile devices. Such a web page may provide access to a back end server system for returning various search results. The search results may be delivered, for example, in a variety of groups associated, for example, with various corpuses of documents. The corpuses may include, for example, web search, image search, news, blogs, shopping (e.g., for price comparison), book search, and other various groups or categories of results. A search button can be pressed to trigger a search, i.e., submit the search terms to a remote or local search engine. The display 102 does not initially show very much information to a user because the device associated with such a display does not know much about the user (e.g., such as content the user likes to read, the user's location, and the user's e-mail account information, among other things).

Because knowledge of a user's location can be helpful in various sorts of mobile scenarios, such as when a user seeks driving directions, the nearest coffee shop, or local weather, a local control 108 labeled "set city" is also provided. Selection of the control 108, or one of opt in controls 110, can cause a change of displays, and cause a prompt to be provided in the display 112 for the user to enter a location identifier, such as a city name (perhaps with state initials), a zip code, or a telephone area code.

Entry of such information by a user may cause a location identifier associated with the location to be added to subsequent queries, such as queries determined to be "local" in character based on the terms used in the queries (for example, queries like "Starbucks," "local pizza joints," or "movies now" might be queries that are judged to be local). The location identifier may be the same as that entered by the user, or may be a related identifier (e.g., if the user enters a town and state name, the system may use the corresponding zip code as the identifier). Particular techniques for determining a default location for a mobile device, and for determining how and when to use location information in generating search results are described in co-pending U.S. Ser. No. 11/624,184, filed on the same date as the instant application, which is herein incorporated by reference in its entirety.

Opt in controls 110 may be selected by the user to provide customization or personalization to the display 102, such as by adding content-specific modules to a user's personalized home page. In the exemplary display 102, a number of general opt in controls 110, which may previously have been determined to be generally useful for a large number of mobile users, are shown. The pictured controls include controls that, if selected, will add graphical weather and traffic information to the page, and can also show a user's top five e-mails in a system associated with a particular e-mail provider. A "more" link may also be selected to have additional sorts of controls displayed, where selection of such control may cause additional content to be added to a personalized page for the device.

The opt in controls 110 may take the form of a simple hyperlink as shown in the figure, or as a graphical object, such as a button associated with certain HTML code. The hyperlink may point to a page at a service provider that generated display 102, and may cause identifying information about the device associated with display 102 to be transmitted to the service, so that the service may associate the request for additional information on a home page with the device. Specifically, and as described in more detail below, selection of a control may cause an HTTP request to be sent to a remote server, and the remote server may use an identifier such as a cookie to identify a user of the device, and to thereby add content associated with the selected control to a personalized home page associated with the user.

In the particular example, the user chooses to have a weather module added to her search page to better customize it. Rather than simply causing the addition of content, the weather hyperlink actually points to an address at the information provider that initially causes a determination to be made whether the device has had a default location associated with it. If the device has such an associated location, the system displays the weather module using that information (not shown). In the pictured example, the user has not yet provided location information before choosing to add the weather module (e.g., perhaps her mobile phone was brand new). As a result, the information provider serves up display 112, which includes a simple input box 114 into which the user is prompted to enter a location identifier. Display 116 shows the weather module having been added to the user's personalized page, and also shows that the user identified herself as being located in beautiful Palo Alto, Calif.

The weather module (or other modules that a user selects) for the personalized home page may be formatted in various manners to best suit the content to be displayed. Here, the information is shown in a standard two-day weather forecast with graphics. Note that the "add weather" control has also disappeared, since the user has now added that module. The other controls have moved upward, and the space vacated by the weather control has been replaced by an "add news" control, which may have been determined to be the fourth-most relevant module relevant to mobile users. Such modules may also be provided based on their associated with particular search terms entered by a user of a mobile device.

As illustrated, the user then selects a "traffic" control 118. In this operation, the service provider's records show a default location of Palo Alto associated with the device. As a result, the user need not provide a location for traffic information that they want to see. Display 120 may thus be displayed immediately upon the selection of control 118, and provides both the weather module 124 and traffic module 126. The now-customized mobile webpage also shows an alert 122 telling the user that the traffic module has been successfully added; in other implementations, such an alert need not be displayed. Also, an "add sports" control has been added to make up for the space vacated by the traffic control. The modules to promote on display 116 of a search page may occur in various manners. In one implementation, for example, modules may be selected for promotion based on overall module popularity (i.e., how many people in the same country as the user have added the module) and/or on the user's own search activity (e.g., search on news and sports related topics may case news and sports modules to be promoted).

Various other controls may also be selected. In some instances, a service provider may simply reflect that a particular module has been selected. In other circumstances, the selection of the control may be reflected along with particular parameters for the control that are associated with a user, as shown in Table 1 below. Certain parameters, such as a location identifier, may be stored separately from particular controls and may be applied across controls.

TABLE 1

Exemplary Modules

| Module | Items/Parameters |
| --- | --- |
| Stocks | Ticker Symbols (e.g., BRCM, GE, etc.) |
| Sports | Teams (e.g., Cal Bears), leagues (e.g., NFL, NCAA basketball, etc.) |
| Movies | Theatre, Genre (as well as location) |
| RSS | Feed IDs |
| e-Mail | User ID |
| News | Sources (e.g., New York Times, CNN, etc.), topics (e.g., business, entertainment, etc.), as well as location |
| Horoscope | Zodiac sign |

As discussed in more detail below, the actions by a user to customize a page in this manner may be reflected immediately in an account associated with a particular user, such as when the user has previously logged into their account earlier in the session. Where the user makes selections without being logged in, the selections can be assigned to the user later, after they identify themselves, such as by logging in. In addition, such changes may also be reflected in personalized pages associated with the user for display on non-mobile, fixed, devices, such as home PCs.

Figure 1B:
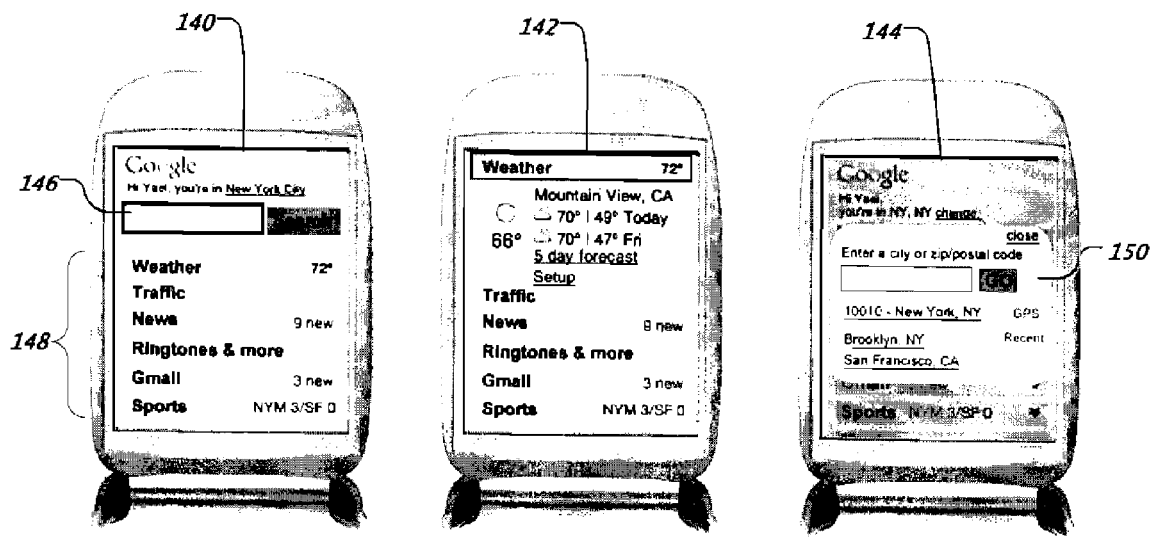
FIG. 1B shows example displays of homepage modules and entry of local information on a mobile device.

FIG. 1B shows example displays 140-144 of homepage modules and entry of local information on a mobile device. In general, the modules displayed may be general modules assigned to a device when the user obtains the device; they may also have been selected by the user in a manner similar to that shown for FIG. 1A. Alternatively, they may have been chosen by referencing another user's modules, or may have been formed by a combination of these methods.

Display 140 shows a search box 146 along with six content modules 148. The search box 146 may be used in a conventional manner to obtain search results for a query, such as a query for "local pizza shops." The user's current default location (New York City) is shown above the search box 146, so that when a user enters queries having a "local" character to them, such as "weather," "traffic," "movies now," "inexpensive italian restaurants," and the like, certain "local" results may be returned for the query, as if the terms "New York City," a corresponding zip code, or the like had been included in the queries.

Each of the modules 148 in display 140 is shown in its contracted state, showing only a limited amount of information, such as a single line. In this manner, a maximum number of modules can be viewed, and the user (a person named "Yael" in this example) may still be able to enter search queries if they would like. Even in the contracted state, certain of the modules display summary information in addition to title information. For example, the weather module shows the current cloud cover and temperature (so that the user can decide quickly whether to wear a coat), the news module indicates how many unread news stories have been received (so the user knows quickly whether to expand the news module), the mail module shows how many new e-mails are waiting, and the sports module shows a summary of a game, and in this case, a game corresponding to the default location of the device (New York City—Mets vs. Giants). In this manner, a user may obtain much information simply by flipping their device open, and perhaps with the activation of the particular application, but without a need for extensive navigation.

Display 142 is the same as display 140, but with the weather module expanded, such as by the user selecting the title bar of that module. (The location for the weather is Mountain View, Calif., either because, for example, the user has entered a different default location or because the New York City location is not permanent, and the weather module is programmed to reference the device's permanent, "home" location.) Here, the search box 146 has been covered by an upward animation of the weather module, since a person is less likely to want to search while they are reviewing detailed information about a module. However, the search box 146 could be retained, it could be removed, its look could be changed, or it could be provided in another form in a pop up window (similar to the pop up window in display 144) or inside the expanded weather module itself. When the expanded module is contracted (e.g., by selecting or clicking on its title bar), the search box 146 may be displayed again.

The weather module supplies a much more detailed forecast when it is expanded, and also provides links to further weather-related information, such as a longer-range forecast. The expanded module could also be configured to display one or more ads associated with the content of the module, such as through the use of the Google Adsense system. Other expanded and contracted modules are shown elsewhere in this document. Various formats may be used for such modules, and third-party users may submit content in various forms, such as XML, to a service provider that then presents the content to mobile devices in a unified manner. Where modules show advertising, the author of content for the module may share in any click-through activity in the module.

Display 144 shows an exemplary technique for changing the default location for a device. The default location may be the location associated with search queries that do not contain an explicit location identifier (such as a zip code or airport code), where the query terms indicate that the search is geographically related and/or when "local" search results are prepared. For example, a search containing the word "restaurant" or "movie" may be determined to be such a local search request, and the system may conduct a search for corresponding restaurants or movie theatres in an area corresponding to the default location, when the user enters such a query without including explicit location-based information. The display 144 shows a pop-up bubble 150 over the display that was previously shown to the user, which may occur, for example, when a user selects the "New York City" hyperlink on display 140.

A search box is displayed in the pop-up bubble 150, along with the location being returned by a GPS system in the device, and a list of recent locations that have been provided to the device (and/or sensed by the GPS system) and/or provided by the user in past queries. An entry box and "go" button are also shown for entry and selection by the user. When a location identifier is entered in pop-up bubble 150, it may become the default location (e.g., replacing "New York City" in display 140). A control similar to pop-up bubble 150 may also be used to permit searching when a user has a module expanded, and may, in particular, permit limited searching on a corpus associated with the particular module (e.g., searching only on a weather corpus when the weather module is expanded, or searching on a particular blog when a module associated with that blog is expanded). A user conducting a search in such a manner may also be taken to a main results page that provides results for a corpus associated with the specific module, and also results for other corpuses.

Figure 2:
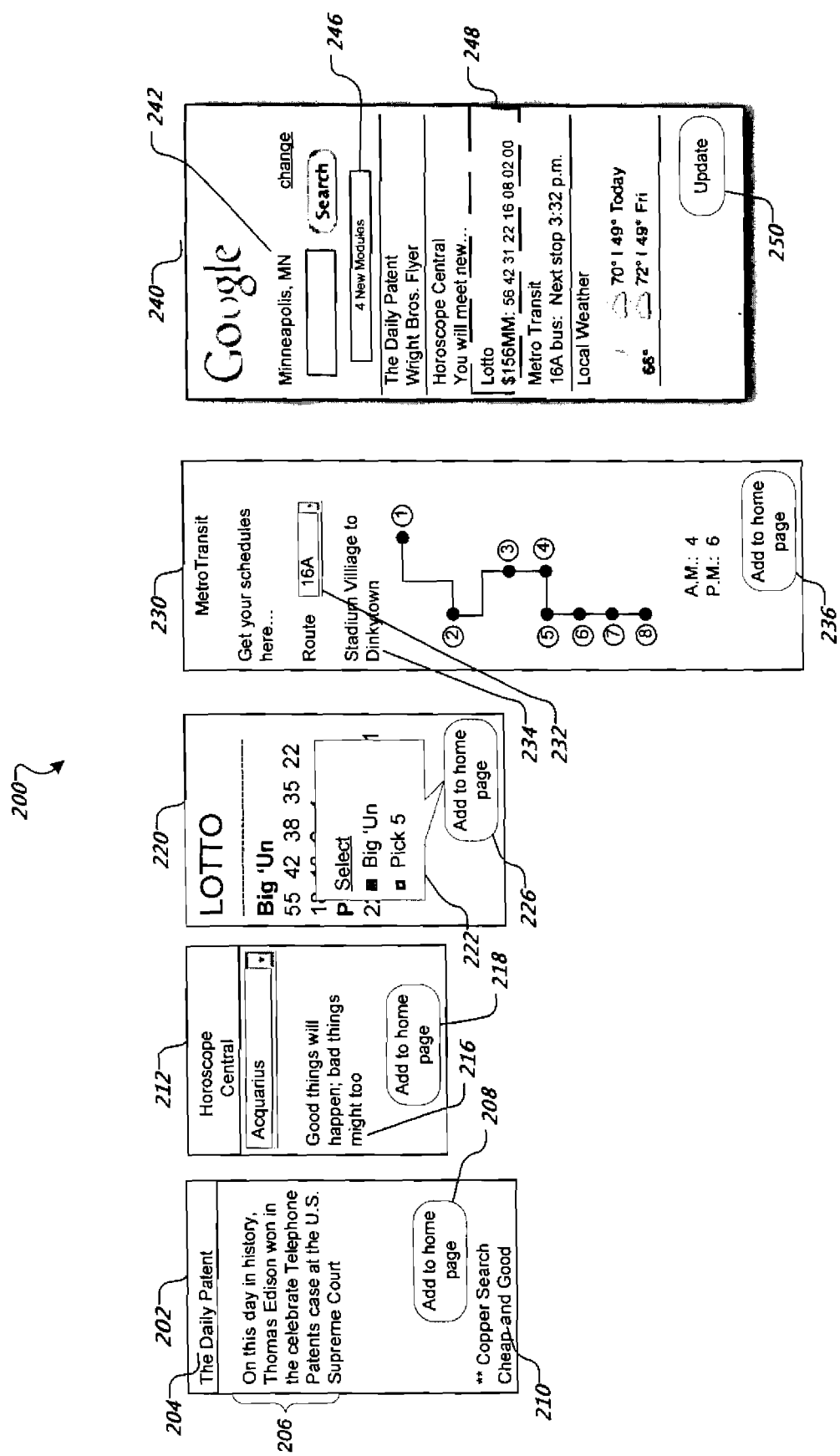
FIG. 2 is a flow diagram showing exemplary displays for adding modules from various web documents to a personalized home page.

FIG. 2 is a flow diagram 200 showing exemplary displays for adding modules from various web documents to a personalized home page. The arrangement of various displays is similar to that of FIG. 1, but the experience being illustrated is of a user discovering various controls for adding modules to their home page as they browse web pages distributed across the internet. In particular, a service provider such as Google may provide web authors with the ability to integrate controls into their web pages that other users can select if they want information associated with the web pages to be part of their personal home page. For example, one person may provide a daily horoscope, and interested users may choose to have information about that horoscope added to their personalized page. In general, the users' action to "opt in" to a feed from a particular page may be made simply by selecting a control, and perhaps adding some additional information, but does not require the user to move entirely over to a configuration page for their home page.

In the example, display 202 reflects that the user, while browsing the internet, has happened upon an interesting site called The Daily Patent. The site may provide a variety of content, including a title area 204 and a "This Day in Patents" daily factoid 206. A control 208 may be displayed in the form of a selectable button labeled "Add to Home Page." In addition, the site may contain advertising 210 in the form of promotional text (and perhaps graphics) that can be selected by a user to take the user to a web site associated with the advertiser for more information. The advertisement may be provided by the author of the web page or may be provided by an external service such as the well-known Google Adsense service.

The control 208 may be directed to a home page manager at the service provider, which, when the control is selected, will receive information identifying the information to be provided on the user's personalized home page, and will also receive identification information for the user, so that the user's home page may be updated accordingly by adding code associated with The Daily Patent. The user identification information may be specific or general. For example, if the user has logged into the service provider using, for example, an ID and password, the particular user can be identified specifically. Alternatively, if the user has not yet logged on, a session ID may be used to identify the user generally, and the specific ID of the user may later be connected with the session ID if the user ultimately logs onto the system, as described more fully below.

The second display, display 212, shows a horoscope website to which the user has navigated. In this example, the user initially selects a parameter—their Zodiac sign of Aquarius—to control the content that is shown or otherwise delivered to them. When they select control 218 to have information associated with the web site added to their personalized home page, the value for the selected parameter may also be sent to the service provider for inclusion in their personalized page, so that, when they later receive information, it will have the appropriate customized information associated with it (e.g., a horoscope for Aquarius). If they select control 218 before identifying the related parameter, they may be prompted to provide the parameter, in a manner similar to the next example in display 220.

Controls 208 and 218 may take a standardized form so that users may more readily identify the controls when they are browsing. For example, a service provider may supply a number of standard images for controls 208 and 218, where the images follow a standard color format and layout, and may also include a logo or other information associated with the information provider. In this manner, someone who has started a personalized page can readily see when they are at a web site that will support the addition of content to such a page. An example of such a common labeling approach is the Google Checkout program.

The third display, display 220, shows another manner for configuring content selected for display on a personalized home page. Display 220 shows a lottery page by which the user can choose to have various daily winning numbers shown on their personalized home page. In this example, values for particular parameters are added after the user selects control 226. In particular, a pop up box 222 may be displayed over the web page, allowing the user to select which lottery numbers they would like to receive on their personalized page or pages. The pop up box 222 may be generated, for example, using Javascript code created by a remote system for placement on the page, as described below, and for operation with the remote system using AJAX techniques or other similar programming techniques. Other parameters may be defined in a similar manner for other sorts of content.

The pop up box 222 may be generated, for example, by code associated with the control 226, which may be code obtained by the author of the web page from the service provider. For example, as explained in more detail below with respect to FIG. 9, a web author may go to a web site associated with the information provider and may use a web form to enter information about the feed they want to have accessed by personalized home pages set up by the service provider. As one example, the user may enter URLs for the particular information, along with formatting information, such as content to be displayed in a display bar for a module, and content to be displayed when a module is selected by a user and be expanded.

Display 230 provides another example showing how a user may provide input to receive customized information. Here, the user is a bus rider, and wants to have a convenient schedule reminder pop up on her cell phone that she can look at while she is waiting for the bus or getting ready to leave work. For example, the service could continually update her device, from a bus schedule, with the next scheduled stop time. The system could also receive real-time status information about her bus and provide an estimate of the next stop time from that information.

In display 230, control 232 is a drop down box that lists all of the bus routes for a particular area (the area can be explicitly supplied by the user or can be determined by looking at a location identifier, such as that derived from GPS data, associated with the device). Here, the user has selected route 16A, and display 234 confirms for the user that that route runs from Stadium Village to Dinkytown. In addition, the application shows a simplified map of the route, with each of the stops along the route. Using, for example, a direction button on a cell phone (or working from a desktop computer, and then later synching the content as described below), the user can identify a morning bus stop (here, stop 4) and an afternoon bus stop (here, stop 6). When the user selects control 236, the parameters will be sent to the information provider and associated with the user's personalized page. The user can also be prompted for any parameters that have not yet been entered.

At display 240, the user has finished surfing and has chosen to review her personalized page. General information from the service provider, such as an identifier and a search box, are shown at the top of the page. Also, a location identifier 242 reflecting Minneapolis as the user's location is also displayed, and can be modified by selection of a "change" link. An update box 246 is displayed to confirm for the user that four new modules have been added to their page, and information from each of the modules is also shown. A previously-added weather module is also displayed. The order of the modules is generally the order in which they were added. However, selection box 248 is shown to indicated that a user has selected the lottery module; when such a selection is active, the user may employ a navigation button to move the particular module up or down in the display 240 so as to further customize the page. Such alterations may occur by simple drag-and-drop mechanisms when the editing occurs on a desktop computer, or by other mechanisms on devices that do not support drag-and-drop operations. Finally, the user may select an update control 250 to confirm any alterations to the page so that they are reflected the next time the user accesses the page.

Each of the modules on display 240 may be made expandable to provide easy navigation while still providing extensive information. For example, The Daily Patent may simply display a title and a single line of information in its contracted form, but may display more information, such as a full factoid and figures, in its expanded form. Likewise, a weather module may show same-day weather when contracted, and a 5-day forecast with updated radar map when expanded. Where a device does not support contraction of modules, an expanded module may simply be left open in its expanded form. Advertising may also be displayed in display 240, either inside or outside the expanded modules. The advertisements may be selected to be particularly relevant to the user by employing Google's Adsense service, or other services for placing targeted advertisements.

Figure 3:
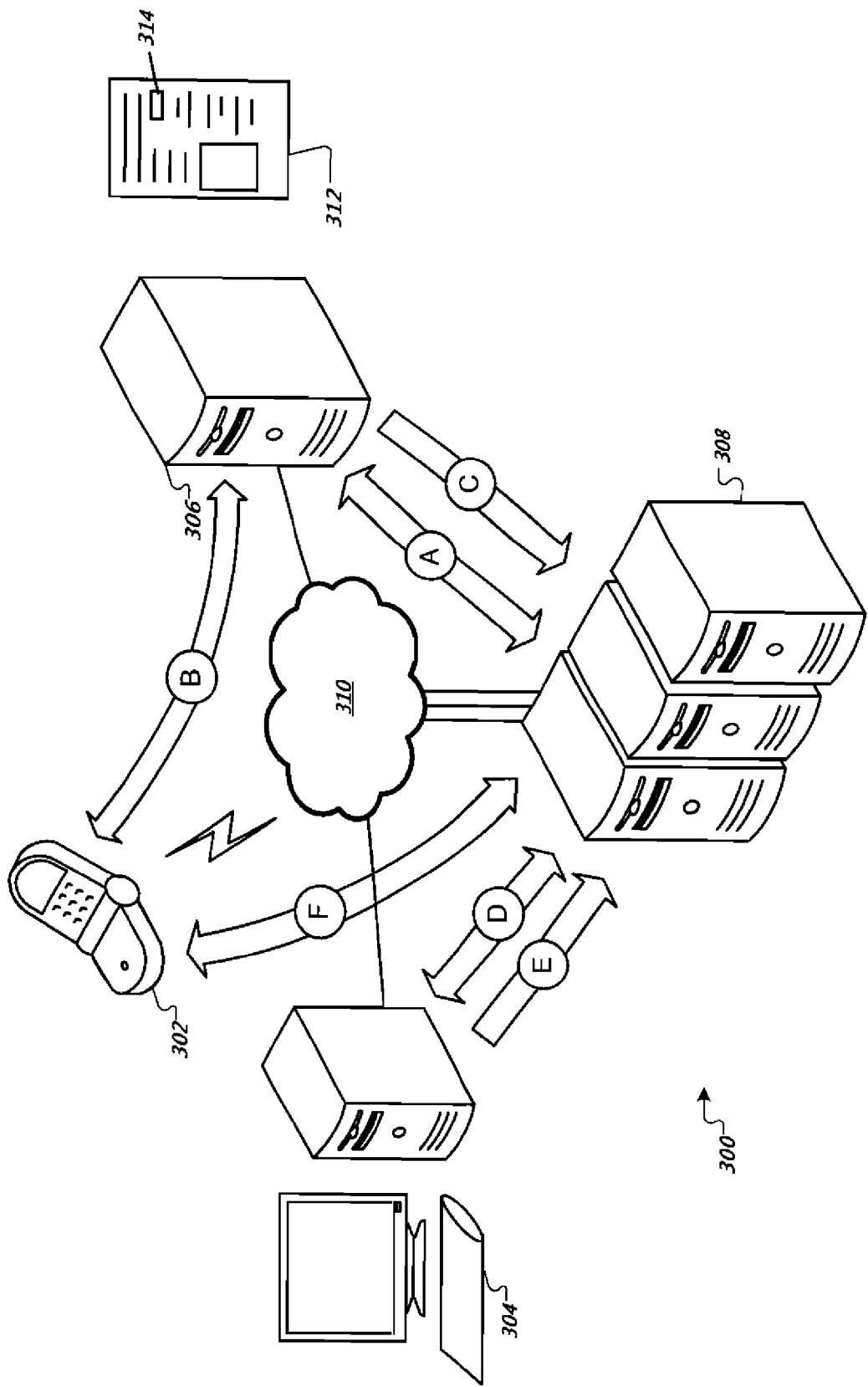
FIG. 3 is a conceptual diagram showing information flow in a system for adding modules to a personalized home page.

FIG. 3 is a conceptual diagram showing information flow in a system 300 for adding modules to a personalized home page. This example also shows synchronization of content between a user's mobile personalized page and their desktop personalized page, which pages may differ from each other. In general, a user accesses a web page, and is redirected to a service provider when they select a control to have information relating to the page added to their personalized home page. Information relating to the content, and information identifying the user, may be combined by the service provider to associate a module on the user's personalized home page with the content.

In the figure, the system 300 includes a mobile device 302 and computer 304 (e.g., laptop or desktop) associated with a user (such as by the user's logging into a central system on the devices), a web page server 306, and a service provider 308, all communicating through one or more networks such as the internet 310. The mobile device 302 and computer 304 are employed in manners similar to those discussed above. The web page server 306 is operated by a third-party, such as independent web page designer. The service provider 308 may include a system such as that provided by Google, with the ability of users to log in and have access to numerous services for free or for a nominal cost.

Various arrows show an exemplary flow of information among the various components. In the example, the flow begins with Arrow A, which represents efforts by a web designer to add a control 314 to her web page 312. For example, the designer may produce a blog that is updated daily with interesting (or not-so-interesting) information that the designer may want to make available to other people. The designer may want to expand his or her reach beyond merely users who navigate to the blog. The designer may log into service provider 308 and fill out a web form, providing information necessary for a module to be set up. For example, the user may define an XML format to be sent from their web page, including information that is to be displayed in a control in both compressed and expanded formats. An exemplary form of such interaction is shown below in FIG. 10.

Later in time, a user of mobile device 302 may be bored (e.g., waiting for a friend) and surfing the web, and may come upon web page 312, as shown by Arrow B. The user may find the blog on the web page 312 to be interesting, and may recognize control 314 and choose to select control 314 so as to have a feed from the blog added to their personalized page. Selection of the control 314 may redirect the device 302 to service provider 308, as shown by Arrow C1 so that identifying information for the user and the page 312 may be obtained by the service provider 308, in updating the user's page. The device 302 may then be redirected back to the page 312.

Alternatively, or in addition, information may be transmitted from server 306 to service provider 308 (Arrow C2). Such information may include configuration information for the delivery of content. In addition, server 306 will periodically submit information to service provider 308 whenever the user chooses to view her personalized page. Such information delivery may take various forms, such as a request from the service provider 308 and a reply in XML format, or alternatively a Really Simple Syndication (RSS) feed. The delivery may also occur directly from server 306 to device 302, with formatting of the page on device 302 rather than by information provider 308.

The user may then arrive at her home and log onto her home PC. Her PC home page may be her personalized page, so that her computer 304 seeks information from information provider 308 or other servers, as shown by Arrow D. The user may be shown an updated page that includes information associate with page 312, or may alternatively be shown a message indicating that new information has been added to the user's personalized mobile page, and asking the user if they would also like to add the information to their PC home page (if the user has logged in). For example, a user may have certain large modules that she does not want on her mobile page, and may have other modules, such as bus schedules and traffic information, that she does not care to have on her main, desktop page.

Arrow E shows a transmission by the user confirming changes to one or both of her pages. This will cause the information provider 308 to update the list of modules supported by each of the user's PC home page and mobile home page. (Coordination may occur between other devices also, such as between a home PC and a work PC, or an individual computer when used during the day versus when used in the evening.) The user may then log on with her mobile device 302, and be alerted to the changes, as shown by Figure F. As explained in more detail below, the changes to personalized home pages may be made at either device, and common elements between the main page and the mobile page may be updated accordingly and coordinated.

Figure 4A:
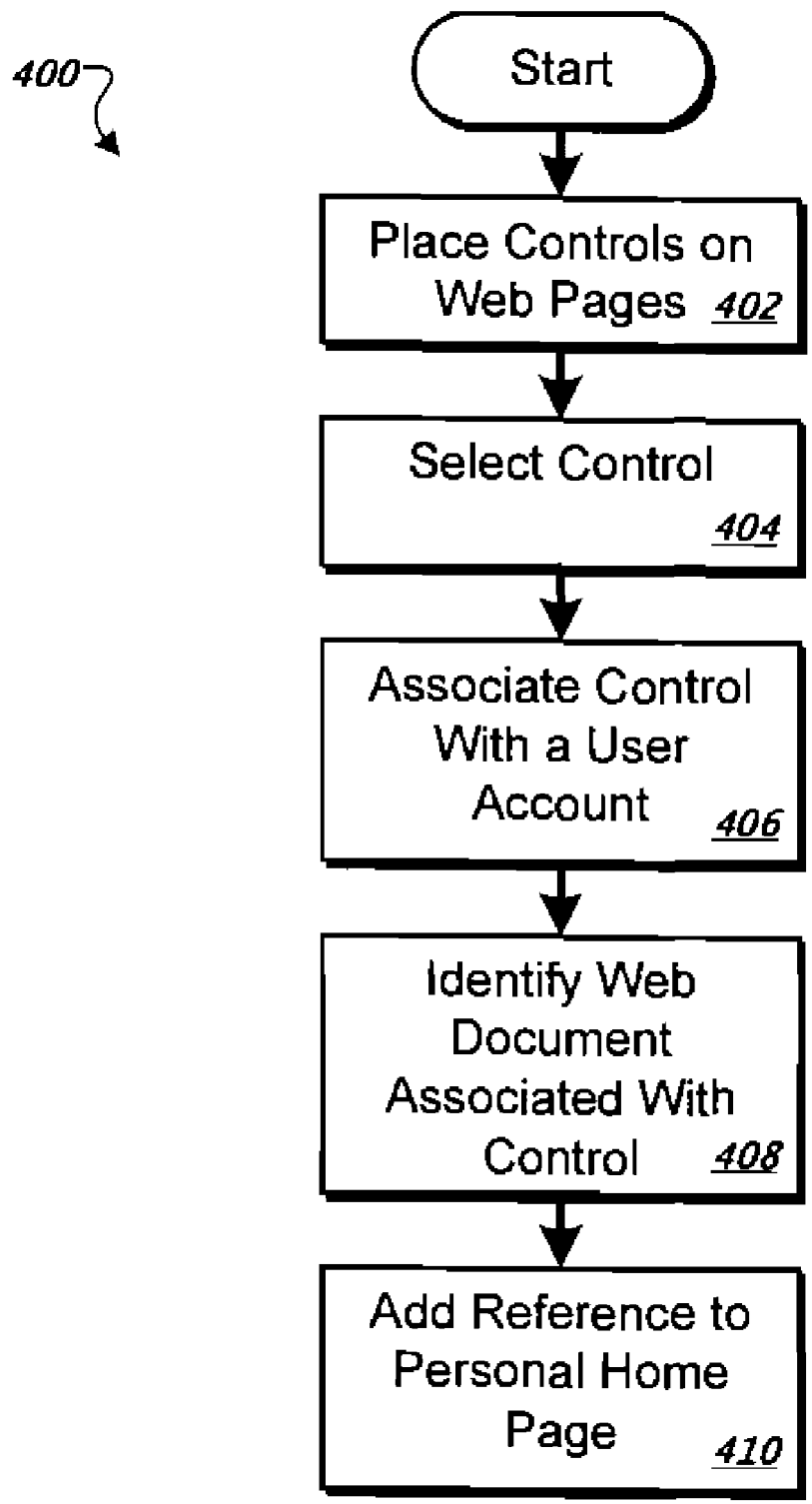
FIGS. 4A and 4B show a flow chart and swim lane diagram for adding information to a personalized home page.
Figure 4B:
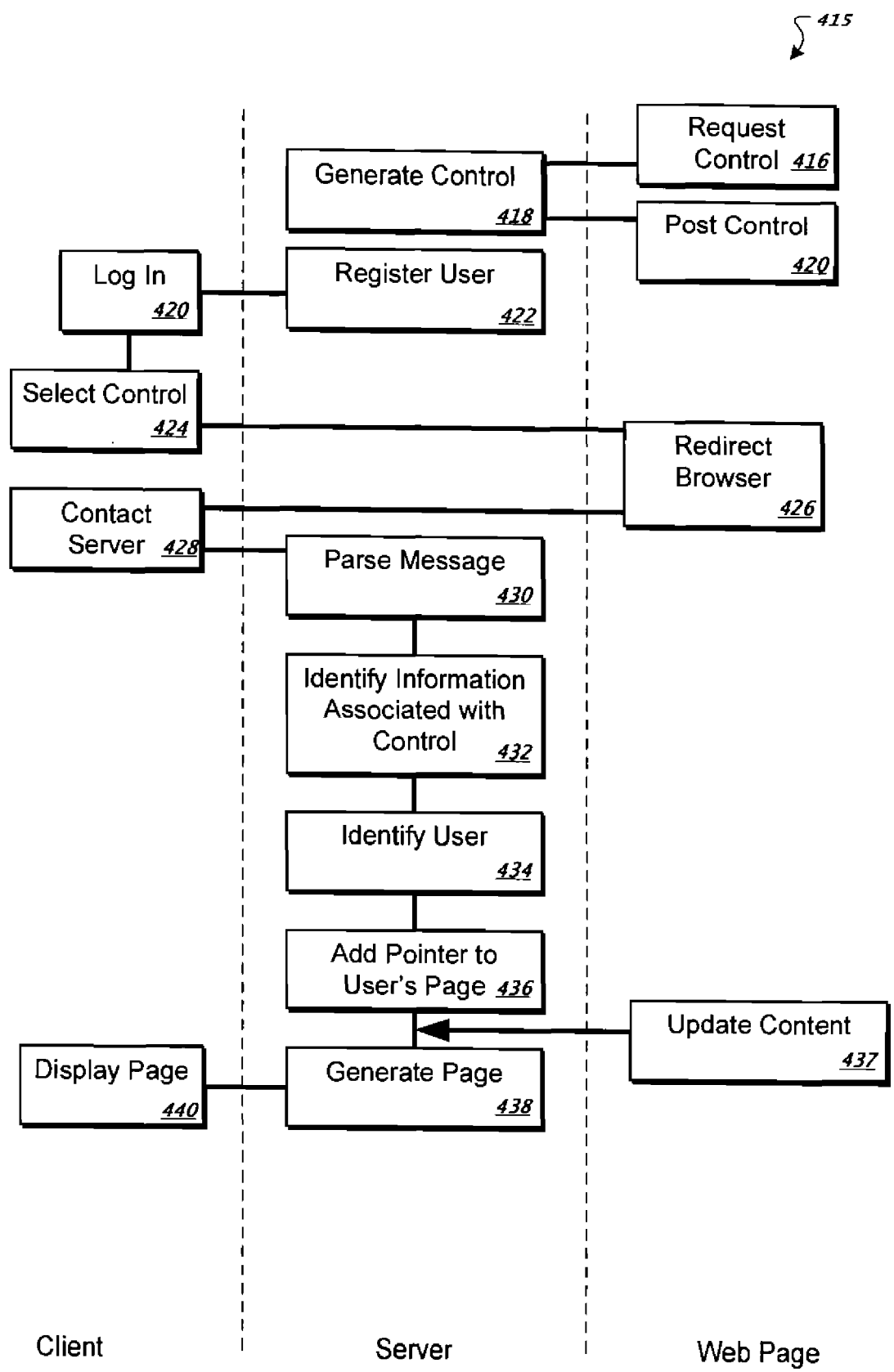

FIGS. 4A and 4B show flow charts for adding information to a personalized home page. Referring to FIG. 4A, at box 402, various web developers initially add controls to their web pages. Such action may occur under direction and with the aid of an information provider. For example, a provider may generate the code for the web developers or may instruct developers how to add the code, such as through a published application programming interface standard (API). Such web pages may then display controls for added related content to personalized home pages.

At box 404, a user visits a web site that has been populated in box 402, and selects a control. Information identifying the user (such as a session ID linked to a user account when a user logged in) and identifying the content to be placed in a module (such as a pointer to retrieve XML information, along with parameters for obtaining the information), may then be provided to the service provider, such as in the form of a browser redirect for the user.

At box 406, the information provider associates the session ID or other information (e.g., information stored in a cookie) with the user account. The association may occur immediately, such as when the user has already logged in during a session or has kept a cookie on their device to assist in identifying themselves to the system. The association may also be delayed, such as when a user has not logged in and there is no other information to identify the user. In such a case, a session ID may be stored, and may then be linked up with the user if and when the user ultimately logs in.

A particular web document is associated with the control at box 408, and a reference is added to the user's home page at box 410. The web document may be various forms of items at a target URL accessible on the internet, such as addresses that return XML data or mark-up code in response to an HTTP request. The reference, which may take any appropriate form for allowing content associated with the control to be displayed on a user's personalized page, may simply include a pointer to be included in the personalized page. For example, the web document may include a URL containing certain parameters, including arguments for providing a personalized page with target information (e.g., a URL to a weather site that includes a zip code for the user). Such a URL may be added to the HTML code for a web page in a static manner, or the page code may be generated dynamically upon a request for the page from a user.

By this process, a user may select a web control, in the form of a button whose selection generates a message to an information provider, that results in web content associated with the control to be associated with the user's web page. The associations may be made by the information provider determining an identity of the user, such as by a log in process, and identifying the content to associate with the user's web page, such as by information provided by action of the user's application or browser upon the user's selection of the control. For example, the selection of the control may cause information identifying the content to be associated with the user's page, and also containing personalization parameters (e.g., the person's zodiac sign or bus route, as indicated above) to be included with the user's personalized page.

FIG. 4B shows a swim lane diagram 415 for adding information to a personalized home page. In general, the depicted process operates by a user selecting to associate certain content with a custom page, and the content thereby being associated, including with certain parameters in some implementations.

At box 416, a webpage developer requests and receives a control from a server, such as a server at an internet information provider such as Google. The server may be a single server or multiple servers operating together to provide various forms of information to users who access the information provider. At box 418, the server generates a control for the webpage developer. For example, the server may present a web form to the webpage developer by which the webpage developer enters certain information relating to the data that they would like other users to see on personalized pages. For example, the webpage developer may identify an address for an RSS feed, or other sort of information delivery mechanism, and personalized pages may access information from such services when the personalized pages are formed.

The server may then generate markup language code for a control (box 418) in the form of a webpage button that can be selected by a user to have such information delivered to their personalized page. That code may be delivered to the web page developer, for example, by displaying the code to permit the webpage developer to cut-and-paste the code into her webpage. Alternatively, the web page developer may simply write such code, such as by referring to a standard API published by the information provider.

Later in time, another person may be browsing the web. That person may learn of the various services provided by the information provider, and may come to register with the information provider (box 422). At the time of registration or at a later time, the user may log into their account (box 420), and may browse the Internet until they come upon the webpage authored by the original webpage developer. They may notice from a message on the webpage that particular content relating to the page may be provided to them on a personalized page, so that they will not need to come back to the webpage each time they want updated information. They may also see the webpage control on the webpage, and may select the control (box 424) to have information related to the page delivered to their personalized page, such as in the form of an RSS feed. Selection of the control may cause the client device associated with the user to start a process for associating the user's personalized page with the particular content.

In one example, the control may redirect the user's browser (box 426) to contact the server (box 428). The URL supplied by the browser in contacting the server may include certain parameters, such as information identifying the content to be delivered to the user's personalized page such as an address for an RSS feed or other information. Upon being contacted in this manner, the server may parse the message received from the browser (box 430), and may extract information for identifying the user of the client device and also the information relating to the webpage. The server may then use the information relating to the web page to identify information associated with the control (box 432) to be incorporated into the user's personalized web page. The server may also identify the user (box 434). The user's identity may be employed to place appropriate references on the user's personalized page so that subsequent accesses to that page will access information associated with the control (box 436).

At some later time, the webpage developer may provide updated content to her webpage, such as by submitting a new blog entry, and the user or another entity may contact the server to have a personalized page displayed. The server may then generate the personalized page (box 438), by which the personalized page may make reference to the webpage developer's page, and the code for the personalized page may be transmitted to the client device and displayed there (box 440). By this exemplary process, web page developers can easily extend the reach of their content, users can organize and access information more easily and with less need for browsing, and information providers may provide better service to their users and also obtain additional avenues for presenting information, including in the form of targeted promotional materials, to all sorts of users.

Figure 5:
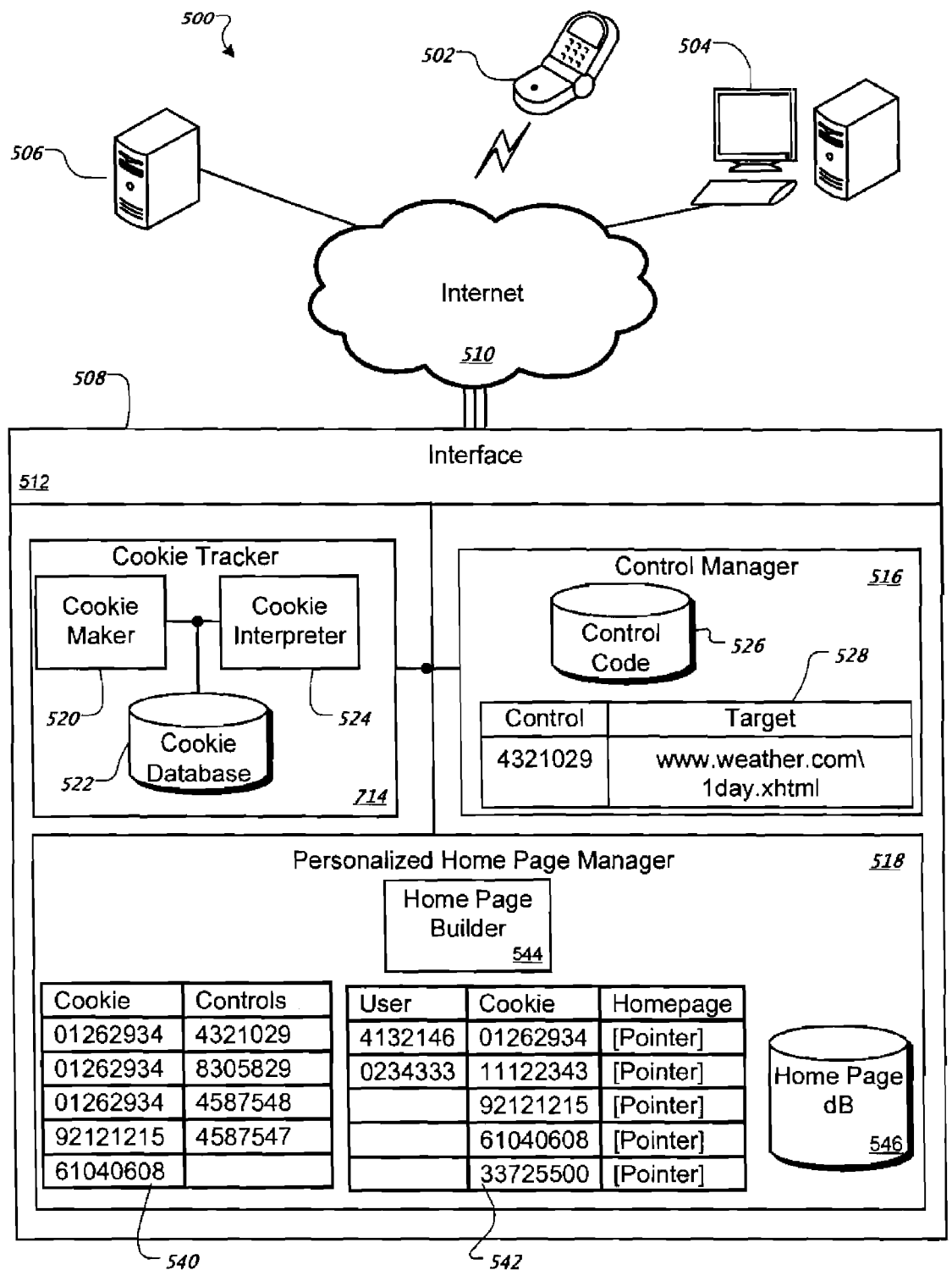
FIG. 5 shows an exemplary system for managing personalized home pages.

FIG. 5 shows an exemplary system 500 for managing personalized home pages. In general, the system 500 may track requests by users to add particular modules to personalized homepages. In addition, the system 500 may coordinate requests made by unknown users with user accounts, when the identities of the unknown users become known. In addition, the system 500 may coordinate content between multiple pages identified by a particular user, such as a page for a user's desktop computer, and a page directed toward the user's mobile device.

System 500 includes a mobile device 502 associated with a user, and a fixed computer 504, such as a desktop or laptop computer, that may also be associated with the user. Computer 506 is also provided, and represents various third-party servers that may provide information for review by users such as the user of mobile device 502 and fixed computer 504. The various devices may communicate through a network such as the intranet 510.

Service provider 508 may coordinate the provision and exchange of information between the other components in system 500, and may correspond, for example, to the servers of information provider 308 in FIG. 3. Service provider 508 may be made up of one or more servers located in one or more locations. In addition, service provider 508 may provide other services not described here, such as provision of search results, traffic information, mapping information, and other similar information.

Service provider 508 may communicate with other components through interface 512. Interface 512 may include, for example, one or more Web servers or other components configured to receive requests through Internet 510, and to provide responsive information to such requests. Control manager 516 may be configured to associate various requests with particular controls displayed on web pages and with information to be delivered to personalized homepages associated with those controls. For example, control manager 516 may include a control database 528 that correlates control identification numbers with information to which the controls are directed. For example, when a user selects a control, an identification number for the control may be provided to information provider 508, and the identification number may be looked up to determine what information should be added to the user's personalized homepage. Alternatively, actual mark-up code may be supplied when the control is selected, or the code may be referenced in another location. In addition, a control code database 526 may store additional code to be accessed by personalized homepages, or other information needed to associate selection of controls with particular information to be referenced by personalized homepages.

Personalized homepage manager 518 may track the information stored in a number of homepages associated with various users. The users may be identified or unidentified. Specifically, an identified user is someone who can be linked to a particular user account, such as a user who has logged into the information provider 508. An unidentified user is someone who has not identified themselves, so that they can only be identified anonymously, such as through the use of session IDs, cookies, or other similar mechanisms. When an unidentified user selects a control, that control may be associated with a session ID or cookie for the user's device through tracking database 540. In one example, tracking database 540 may be a flat file database that correlates cookies with identification numbers for all controls selected by a device associated with the cookie; other implementations may also be used. In general, tracking database 540 may store information temporarily, until the identity of a user associated with a cookie or session ID can be determined, such as by the user logging in on their device.

A user database 542 may track modules or other information to be associated with personal homepages when the identity of the users is known. For example, the first two entries in the user database 542 show the selection of particular information by users who have logged in, and that is associated with a cookie or other device or session identifier. The user database 542 may also contain information for unidentified users. For example, the last three entries in user database 542 correlate a device identifier with information for a personalized homepage, but do not yet have an associated user identifier. When a login occurs on a device associated with the identified cookies, the user identifier may be added to the database 542. Also, when a user logs in, a connection may be made between a cookie associated with the device that is logging on, and controls in tracking database 540.

The homepage information identified in the user database 542 by the label "[pointer]" may take various forms, such as URLs or other information that allows a personalized homepage to access various information providers. The homepage database 546 may store additional information about each user's personalized homepage, such as color schemes, layout, geographic location, and other parameters of the homepage.

Homepage builder 544 may be employed to assemble a personalized homepage when a user who has identified herself makes such a request. For example, homepage builder 544 may access homepage database 546 and user database 542 using a user identification number as a key. The homepage builder 544 may extract information about the desired homepage layout, and may also extract all pointers or other identifiers associated with modules on the homepage. By conventional mechanisms, the homepage builder 544 may assemble this information to generate markup code for the personalized homepage that may then be transmitted to the requesting device for display by the device.

Cookie tracker 714 may permit identified users to select modules for inclusion in their personalized homepages, and may also permit for the association of those modules with particular user accounts after an unidentified user has identified herself. When a user selects a control and is directed to information provider 508, cookie tracker 714 may look for a cookie file having a predetermined name on the user's device, and retrieve a cookie from the file if such a file exists. Information about particular cookies may be stored in a cookie database 522. A cookie may take any appropriate form that permits identification of the device, such as the form of an a numeric indicator that is unique or substantially unique to the device. Cookie interpreter 524 may receive any identified cookies and associate them with a selected control for provision to personalized homepage manager 518. For example, a mobile device may submit a control number as part of a URL, and may also store a cookie, so that the information provider 508 associates the cookie with the control number, so that a module associated with the number is added to a personalized home page for the user of the device.

Cookie maker 520 may produce cookies when a device is found to not yet have a cookie relating to information provider 508. Cookie maker 520 may select cookies in any appropriate manner, such as by indexing through a body of numbers or alphanumeric presentations, or by other mechanisms. The cookies may be generated by cookie maker 520 or may be obtained from cookie database 522.

In one exemplary mode of operation, a user may identify a webpage on server 506 and may select a control displayed on the webpage so as to have information, such as a daily blog update, delivered on their personalized homepage. Such a selection by the user may cause information provider 508 to create a cookie and deliver it to mobile device 502. The information provider 508 may also store the cookie and information about the control in tracking database 540. The user may subsequently select other controls on other web pages, and the information provider 508 may also store information from those controls along with the cookie. Later, the user may log into the information provider 508, and the information provider may then associate the cookie with the user ID. The information provider 508 may check tracking database 540 for any records associated with the cookie for the user's device, and may then associate the control information for each such record with the user's personalized home page.

Subsequent accessing of the personalized home page by the user may result in information relating to the selected controls being delivered to the user.

Figure 6:
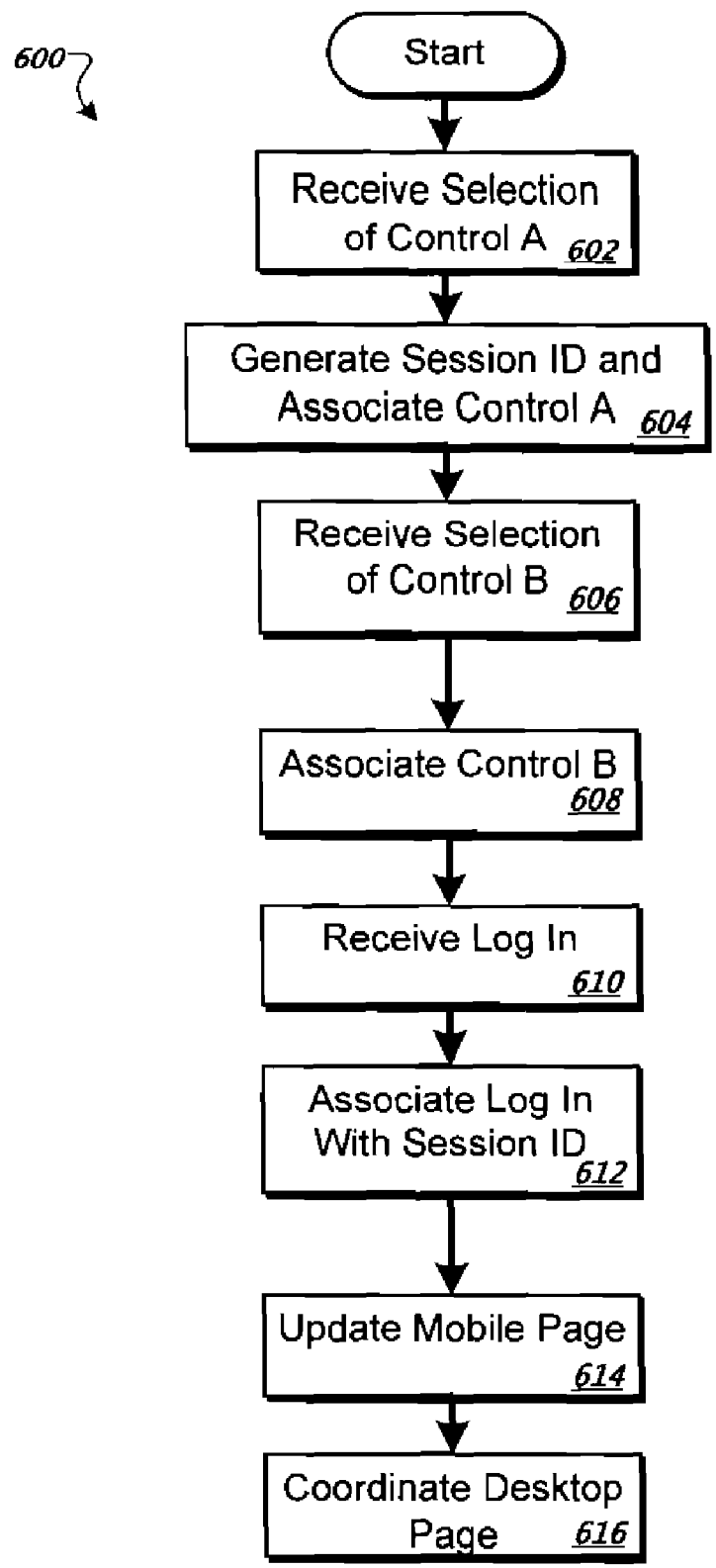
FIG. 6 shows a flow chart for the coordination of content between mobile and non-mobile personalized pages.

FIG. 6 shows a flow chart for the coordination of content between mobile and non-mobile personalized pages. The depicted process is similar to that just described. At box 602, a system receives a selection of a first control—control A. The selection may be received via the redirection of the user's web browser to the system after the user has clicked on the control provided by a third party. At box 604, a session ID is generated and associated with control A. Later, at box 606, the system receives a selection of a second control—control B. Using the already-stored session ID, the system may associate control B with the session ID. At this point, the identity of the user of the device associated with the session ID is not known, so the control identifiers are associated only with the session ID. Of course, during this same time, other users may also be submitting control identifiers.

At box 610, a process of identifying the user associated with the device begins with a login by a user of the device. The log in may take a standard form, such as by the provision of a User ID (e.g., an e-mail address) and a password. As part of the log in, the session ID may also be obtained and associated with the log in (box 612), and the user's personalized home page may then be associated with modules relating to Controls A and B. The user's mobile page may be updated to include references to those modules (box 614).

In addition, in manners described below, other of the user's home pages may also be updated. For example, the modules added to the user's mobile page may be added automatically to the user's other pages. Alternatively, the user may be prompted to select which of modules relating to controls A and B they would like added to their other page. In addition, certain filters may be applied so that some modules do not get shared. For example, modules requiring graphics that are not available on a mobile device can be filtered out from that device, while modules that are uniquely mobile in character may be filtered out from a desktop personalized home page. In addition, updates from one side may be applied to the other side using predetermined rules, such as acceptance of the most recent change in a group of changes, or the application of all changes in the group of changes seriatim.

Figure 7:
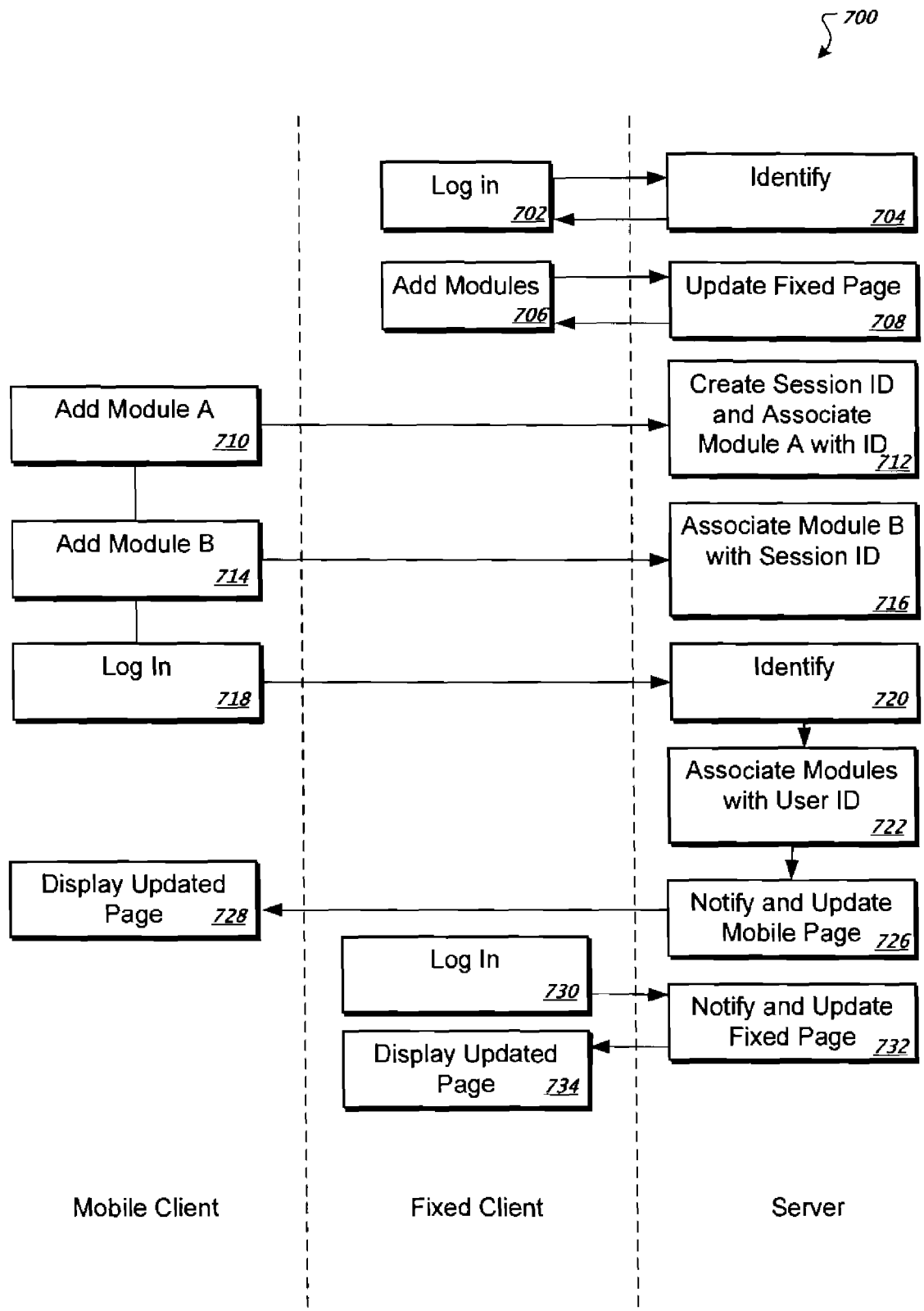
FIG. 7 is a swim lane diagram showing actions for coordinating content between personalized pages.

FIG. 7 is a swim lane diagram 700 showing actions for coordinating content between personalized pages. Like the process shown in FIG. 6, the process here follows a user who adds modules for use in a personalized home page, and later identifies themselves so that the modules can be linked up with the user's home page and other home pages associated with the user. In addition, the process is shown with modules being added both at a fixed client (e.g., desktop or laptop computer) and a mobile client (e.g., PDA or cell phone).

At box 702, a user logs into a server on their fixed computer, and the server identifies the user (box 704). Such actions may involve a typical log on process. The user may also configure a personalized home page for their desktop computer, such as the Google personalized home page. The configuration process may involve selecting controls associated with particular modules (box 706) to add those modules to the personalized home page, which the server may then update (box 708). Through this process, the user may have a home page that includes information that is particularly useful to them.

At box 710, the user then leaves her house and begins browsing the internet from her smart phone. At box 710, she finds a blog that is very interesting to her, and she selects a control displayed with the blog that adds a Module A, daily blog, delivery to her personalized home page. At this point, the server does not know who the user is, and thus generates a session ID for the mobile client, and associates the information for Module A with that session ID (box 712). The user then moves to another web site, and again selects a control (box 714) so that the server associates information related to the selected control, Module B, with the session ID for the mobile client device. The user now has two additional modules, but they are not yet associated with the user.

The modules become associated with the user when the user logs in to the server (box 718), and the server identifies the user (box 720). The server may then associate the particular session ID with the person's user ID, so that the module information stored with the session ID can then be connected to the user ID so that the user's personalized page displays the various modules (box 722). The user's mobile page may then be updated (box 726) and displayed (box 728), including by adding modules like those shown in box 706 from the fixed client home page. The user may shown a list of possible modules to add to their mobile home page, such as modules previously selected on their fixed client. The new mobile modules may likewise be added to the user's desktop home page, either immediately, or later upon the user logging into the server (box 730) from the fixed client, and then being able to review the updated display (box 734).

The identification of the mobile client may occur in other ways also. For example, after a user has configured a fixed home page, the user may make a selection to have a text message, such as an SMS message, sent to his mobile device. The message may include a URL or other similar mechanism that may direct the user's device to a particular address, and may also include identifying information for the user or the user's device. In this way, a user can minimize the amount of information they need to have using their mobile device, and can easily configure the content for the mobile device using a desktop computer, and then easily link the mobile device to the user.

FIGS. 8A-8E show flow diagrams for coordinating content between different forms of personalized home pages. In general, the figures show the evolution of displays for a user, from left to right, as the user takes certain actions. The user's fixed computer, having a full display and other output capabilities, is shown, generally, in a top row, and a display of a user's mobile device having limited display capabilities (e.g., small screen and lack of support for certain rich media functions) is generally shown in a bottom row. Each of FIGS. 8A to 8E shows an exemplary scenario by which web page content may be coordinated between the user's fixed page and the user's mobile page.

Figure 8A:
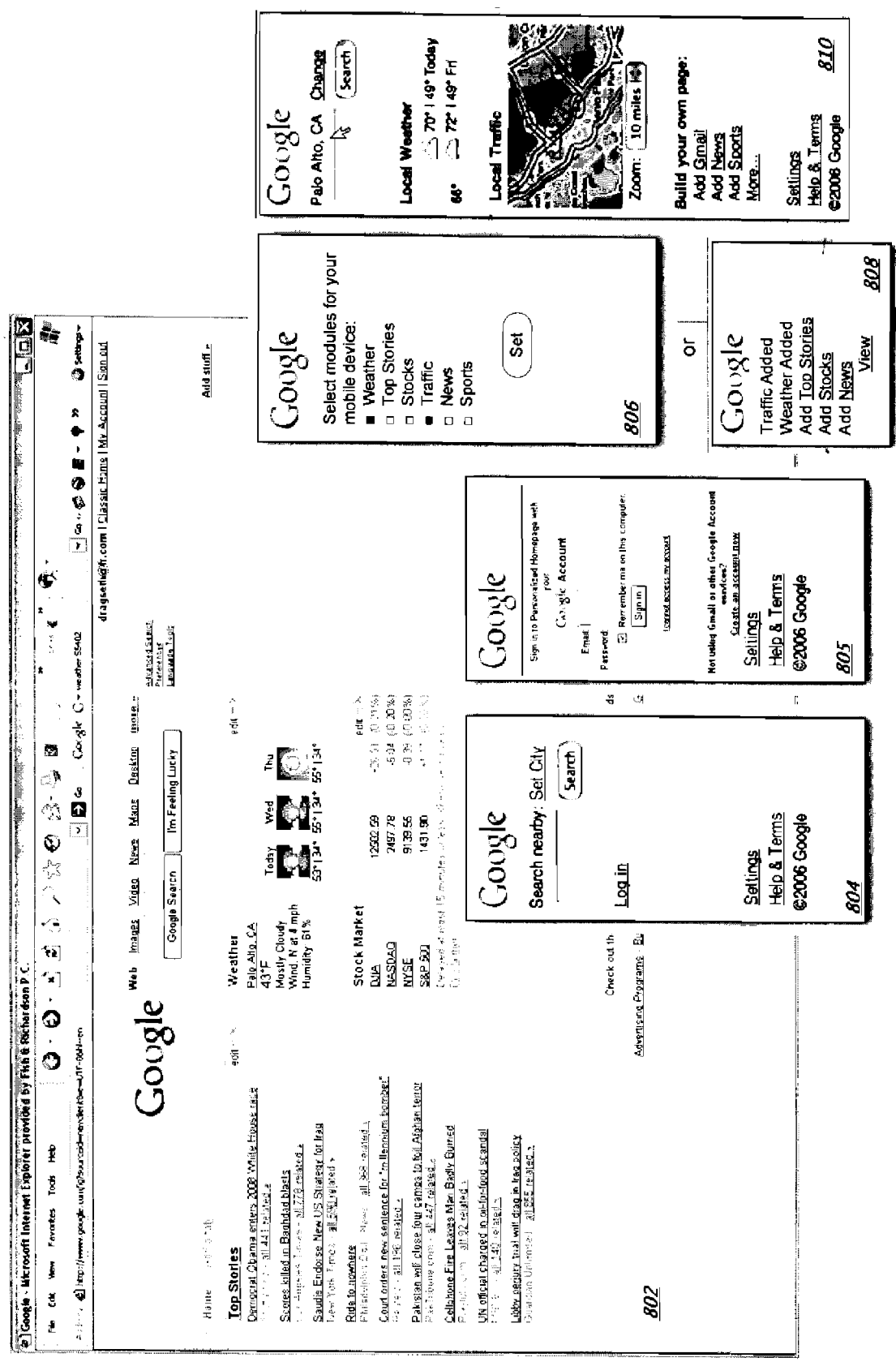

FIG. 8A generally shows a scenario in which a user has set up a personalized fixed page for their desktop access (e.g., at home or at work) while logged into their account with an information provider such as Google, and then logs into their account from a mobile device. In display 802, the user has configured her personalized page to include general breaking news headlines (Top Stories), local weather for Palo Alto, Calif., and up-to-date stock market information.

The user then leaves home and reaches the Google Mobile Search site on her mobile device, at display 804. Instead of entering a search, she selects the "log in" control and is taken to display 805, where she can enter her email address and password identification information. In other implementations, other information may be used to authenticate a user. Upon logging in, the system generating the displays recognizes her as someone already having an account (via her user ID provided in the form of an e-mail address), and also as having a personalized home page associated with that account. The system may also note that she has not configured any modules for her personalized mobile page.

As a result, the process will begin actions to provide the user with the opportunity to populate a mobile personalized page with various modules. Such interaction is shown in display 806, where each of the modules associated with the user's desktop page (i.e., weather, top stories, and stocks), and also general modules thought to be particularly relevant for mobile use (e.g., traffic, news, sports), are shown. The user may be provided an opportunity to select which of these categories they would like displayed as part of their personalized mobile page. When the user selects "set," pointers to such content, such as URLs containing necessary parameters, may be included in the user's personalized mobile page. In this example, the user's personalized mobile page shows weather and traffic information, while its personalized desktop page shows top stories, weather, and the stock news.

Display 808 shows an alternative display for permitting a user to select modules for inclusion on a mobile page. The various available modules (e.g., those on the desktop page plus others directed to mobile use) may be presented in a simple list where each member of the list is associated with a URL. Each option will be displayed as "Add [module]." When a user selects one of the choices (e.g., by navigating using a directional pad on a cellphone and then pressing a selection key), it changes to "[Module] added," without an option to remove. The "[module] added" reference may alternatively be made selectable so that users can remove certain modules form the mobile page.

Display 810 shows the final result for the mobile home page, where the page has inherited the location of the desktop page, so that the user does not need to enter a location on their mobile device. In addition, the mobile page has picked up the weather module from the desktop page and has added a traffic module. Depending on rules implemented in the system, the traffic module might or might not be presented to the user for inclusion on their desktop page the next time they log in from a desktop computer. For example, because traffic has been identified here as a mobile-specific module, it may not be made available at all unless the user takes explicit actions to add it to their desktop page.

Various other techniques may be used to identify appropriate modules for a mobile page. For example, certain modules such as graphics-intensive modules may be inappropriate for display on the mobile device, and may be eliminated from the class of modules on the desktop page that are made available to the mobile page. In addition, two different forms of a particular module may also be provided, with a less graphics intensive module being delivered to a mobile device and a more graphics intensive version of the module being delivered to a fixed computer.

As explained above, differences between modules on a desktop page and those on a mobile pages may be resolved in various ways, such as by predetermined resolution rules. For example, if a desktop page and a mobile page both display stock ticker information and the user adds a new ticker symbol on one page, that change may automatically be replicated over to the other page. Other information might not be updated, such as location information, because a user may want to temporarily change the location on a mobile device (e.g., while on a business trip) but not make the same change to their desktop page. Overlapping deletions and additions of information may be handled by predetermined synchronization rules also. In addition, a single page may be stored for both mobile and desktop display, with tags in the mark-up code identifying which portions of the code are to be rendered for each type of display.

Figure 8B:
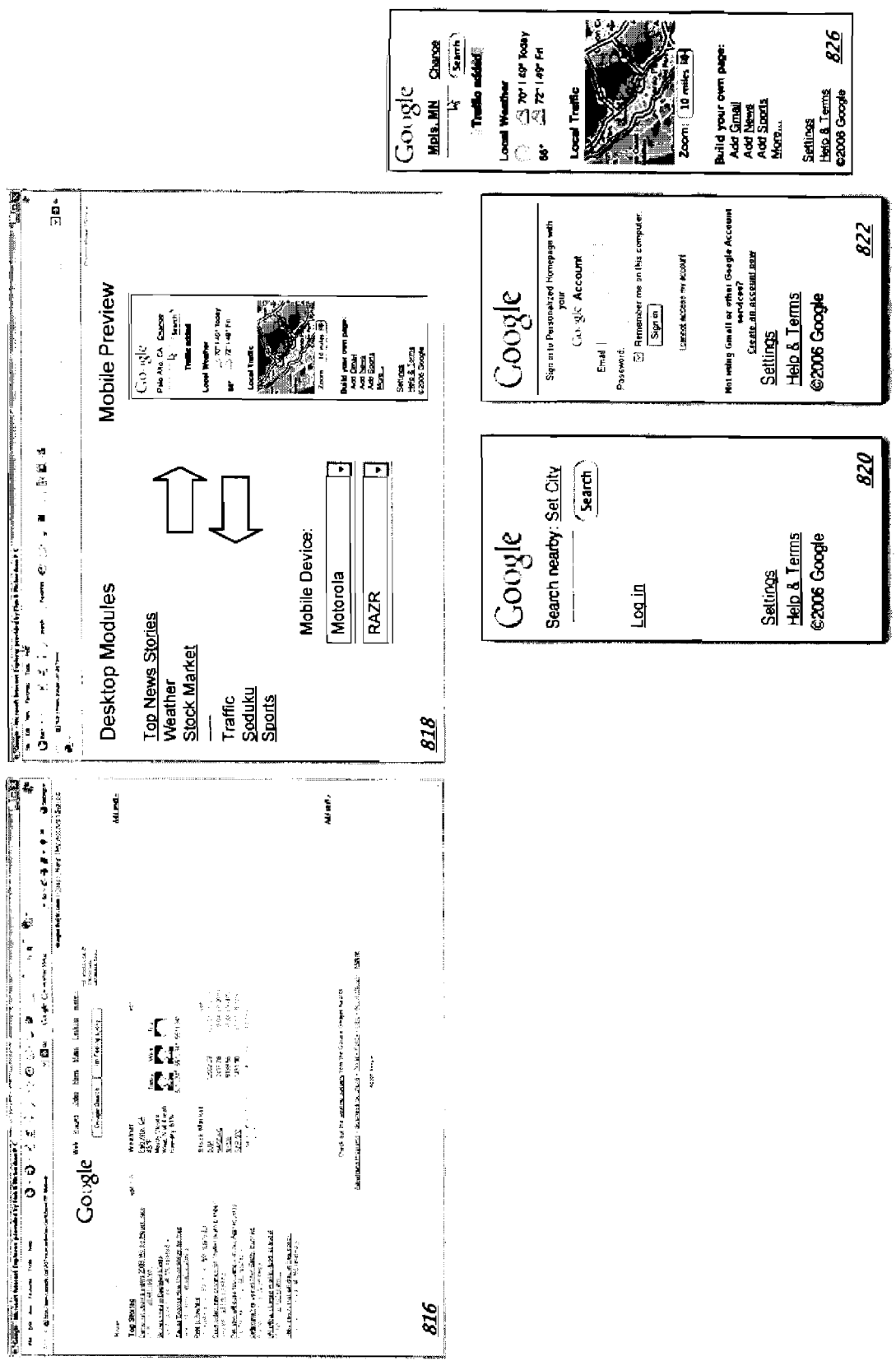

FIG. 8B shows an example of a user configuring her mobile page form her desktop. Such an approach may be preferable where the user wants to make many configuration adjustments, as such action may be easier on a full-featured computer than on a mobile device.

Display 816 shows a desktop page containing modules for top stories, local weather, and stock market information. The user then makes a selection to configure a corresponding mobile page, and display 818 is shown. The display 818 contains two main areas—an area displaying a list of all modules currently on the desktop page, along with mobile-specific modules like traffic, Soduku (for the "bored now"), and sports scores. The user may move certain modules over to the mobile page in a variety of ways. For example, the available modules are shown as hyperlinks on which the user may click to have the corresponding module added to the mobile page. (The hyperlink status has been removed from weather and traffic because they have already been added.) Alternatively, the user could drag modules from one side to the other and drop them, or use the arrow controls to move selected modules back and forth.

The right-hand side of display 818 provides a user with a preview of the modules displayed on their mobile device. Standard transcoding techniques may be used to display the content to a resolution, and using a color depth, that is available on the device. The preview display may be beneficial in permitting a user to see whether particular modules will look good or bad on their mobile device, and to easily include or exclude them on that basis. Separate pulldown controls are made available so that a user may easily identify a make and model for their mobile device. The system may separately store parameters associated with a number of mobile devices to assist in the process of rendering the content on the preview display. In addition, the preview display may be made interactive, so that a user may expand and contract modules so as to see how they look in all forms. Such actions may occur by rendering the content for a particular display, or by associating controls on the modules with links that cause the preview to be re-rendered each time a change is made.

The mobile displays 820, 822 and 826 show actions by a user on their mobile device after they have configured their personalized mobile page. Display 820 shows a typical search screen, while screen 822 shows a log in screen 822, like those shown in FIG. 8A. When the user logs in, the system may look to their account and see that they have a configured personalized mobile page, and may display the page as display 826. Certain confirmation screens may also be shown, such as a screen after the user has logged in, to tell the user that changes have been made to content associated with their mobile device. In addition, if a cookie has previously been created for the device, and the user has logged in so that the cookie has been associated with the user's account, the personalized page may be shown immediately using the cookie to associated the device with the personalized mobile page.

Figure 8C:
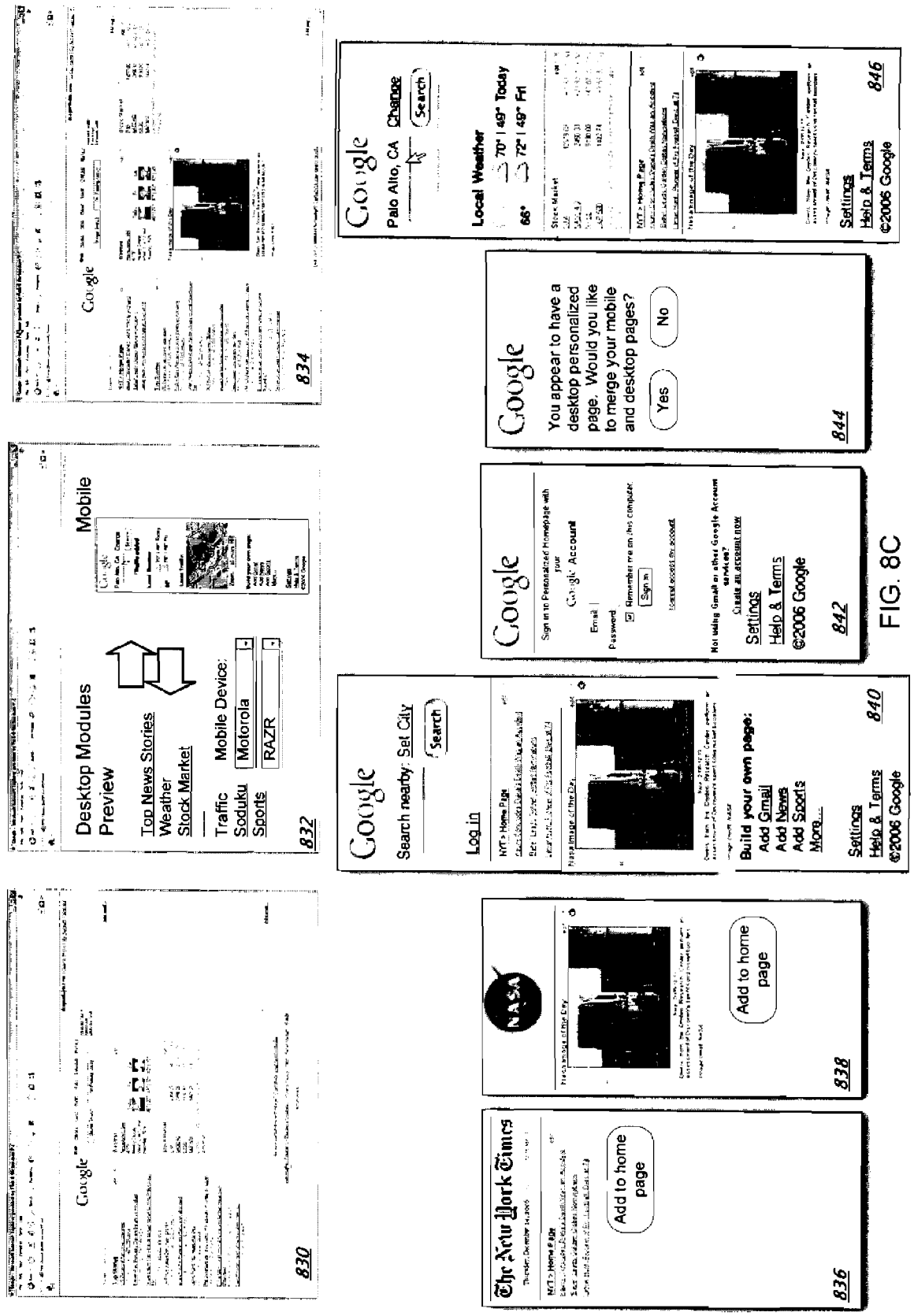

FIG. 8C shows an example in which a user initially sets up his personalized mobile page from his desktop computer and subsequently adds more modules form his mobile device, followed by identifying himself to the system. Many of the displays, such as display 830 and display 832 are the same as, and serve the same function as, the corresponding displays in FIG. 8B. However, in this example, the user selects to add content relating to display 836 (a site that provides stock quotes) and display 838 (a site that shows a new NASA picture of the day) to their personalized mobile page. At the time the user selects such content, he has not yet logged into the system. However, the user may ten navigate to a site such as the Google web site, and the two selected modules may be displayed along with controls that permit the user to identify a location and for the user to log in to the system.

At displays 840 and 842, the user visits a search screen and then logs in. Display 844 provides a confirmation for the user. The confirmation may take many forms, but in this example, the display 844 asks the user to confirm whether he wants the newly added modules to be added to his personalized desktop page in addition to his personalized mobile page. The user in this example answers in the affirmative, so all the modules are shown, in the end, in both desktop display 834 and mobile display 846.

Various other arrangements may be made to coordinate updates to mobile and desktop personalized pages. Six examples may provide additional illustration of such approaches, and are similar to those shown in FIGS. 8A-8E. In example 1, a user has not configured mobile modules on his PC, and when he logs in to a system on his phone, the system prompts him to choose which mobile-friendly modules he would like to add from his personalized desktop page. In example 2, a user has already configured her modules on her PC, so when she logs in, she is shown her already configured page. In example 3, the user has configured his page on his PC and has a cookie-based page on his mobile device; when he logs on from the device, the system merges the sets of modules and displays a message communicating the action. In example 4 the user has not configured on his PC but has a cookie-based page on his mobile device; we he logs on form the device, the system copies the cookie-based settings to become the logged on settings for the user's account. The user may click to add more modules, and may be shown a list in which the modules on his PC are highlighted. An alert may be shown on the PC display to alert/remind the user about the change. In example 5, the user is logged in on his phone. If a user adds modules, the system may add the modules to his desktop page and may provide an alert message for viewing from the PC. If the user adds a module to the PC, the module or a corresponding module may be displayed on the page for the mobile device or a control for adding the module may be displayed on the mobile device. If the user deletes a module on his PC, the mobile modules may be left untouched. In example 6, the user has a cookie based mobile page, and logs in, so that the system copies the cookie based settings to the user's account for a mobile page, and can use it to suggest additional modules or provide it as a default when the user logs in on his PC.

Figure 8D:
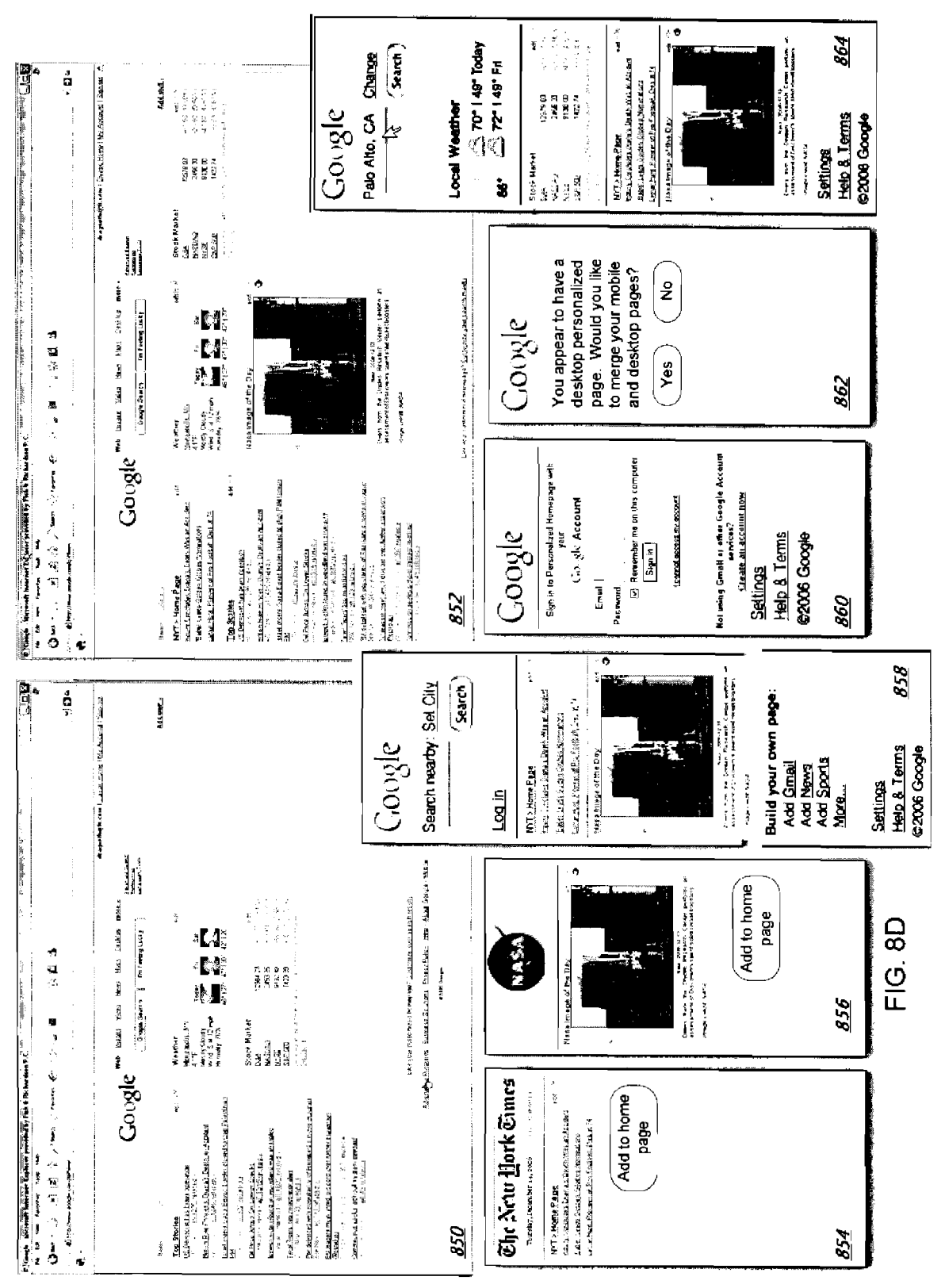

FIG. 8D is similar to the example in FIG. 8C. Here, however, the user has now set up a mobile page, but has added modules to his personalized mobile page without configuring the mobile page using his desktop computer. Display 850 shows a personalized desktop page having three modules. Display 854 shows a web page visited by the user on a mobile device, relating to the New York Times, while display 856 shows a similar page for a NASA picture of the day. In the example, the user selects the "add to home page" controls, and a central system stores information relating to the controls in addition to a session ID. At display 858, the user navigates to a search screen, which shows the selected modules (though the system has only identified the user so far via a session ID) and chooses a "log in" control. The user is then presented with a log in display 860.

When the user logs in, the central system associates the session ID with the user ID, and attempts to correlate the newly selected modules with the modules that are already a part of the personalized desktop page. In this example, the default rule is to make each of the personalized desktop page and the personalized mobile page contain a superset of the modules selected either on the desktop computer or on the mobile device. In other implementations, the system can show only the cookie-based modules on the mobile device personalized page. Display 862 announces to the user that a desktop page has been located for them, and asks them to confirm that they would like to combine the newly selected modules into the desktop page, and to have the modules in the desktop page be part of their mobile page. In other implementations, the user need not be asked to confirm alterations to the mobile or desktop pages. If the user answers in the negative, alternative approaches can be taken, such as by keeping separate desktop and mobile pages. Display 852 shows the result of the actions on the desktop page, while display 864 shows the result on the mobile page (with each of the modules expanded).

Figure 8E:
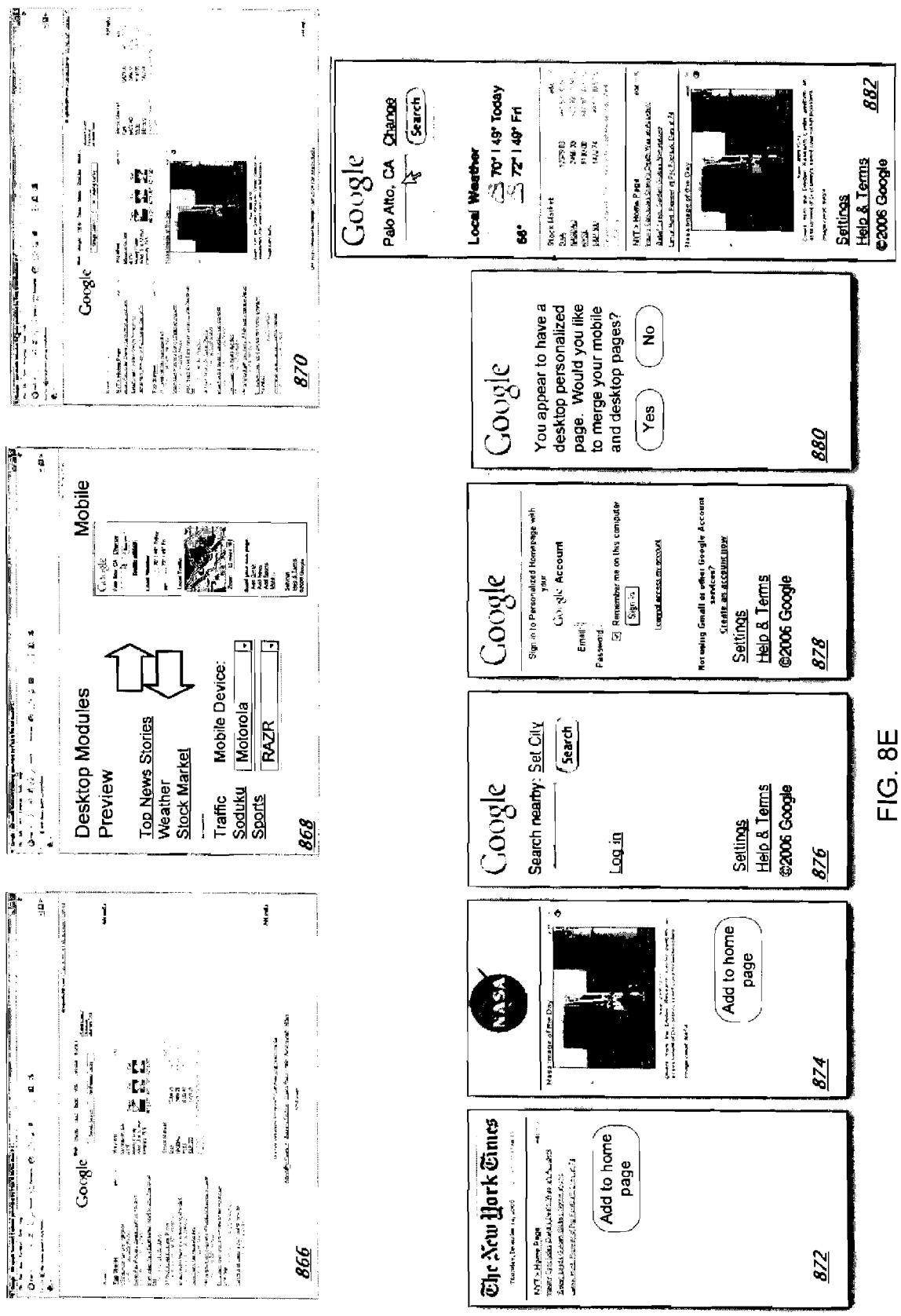

FIG. 8E shows a combination of desktop-led configuration followed by mobile addition of web pages, in manners similar to the prior examples. The before and after desktop pages are represented by displays 866 and 870. A third desktop display 868 represents actions by the user to add weather and stock information to their personalized mobile page. In this example, because the user has specifically chosen particular modules form the desktop page to be added to the mobile page, only those modules are added when the user logs in from a mobile device (unlike in FIG. 8D, where all of the modules were added to the mobile page).

In the mobile displays, display 872 represents the addition of content form the New York Times to a user's page, while display 874 represents the addition of a NASA picture of the day. Displays 876 and 878 represent, respectively, a user's navigation to a search page followed by a log in with the system operating the search page. Display 880 shows a confirmation message by which the user is provided the opportunity to state whether they would like the various added information shared between their two different personalized pages, and display 882 shows the updated display, with the New York Times and the NASA pciture of the day added to the weather and stock modules previously on the page. (The Top Stories module may have been removed in favor of an alternative display or may occur lower on display 882.)

Figure 9:
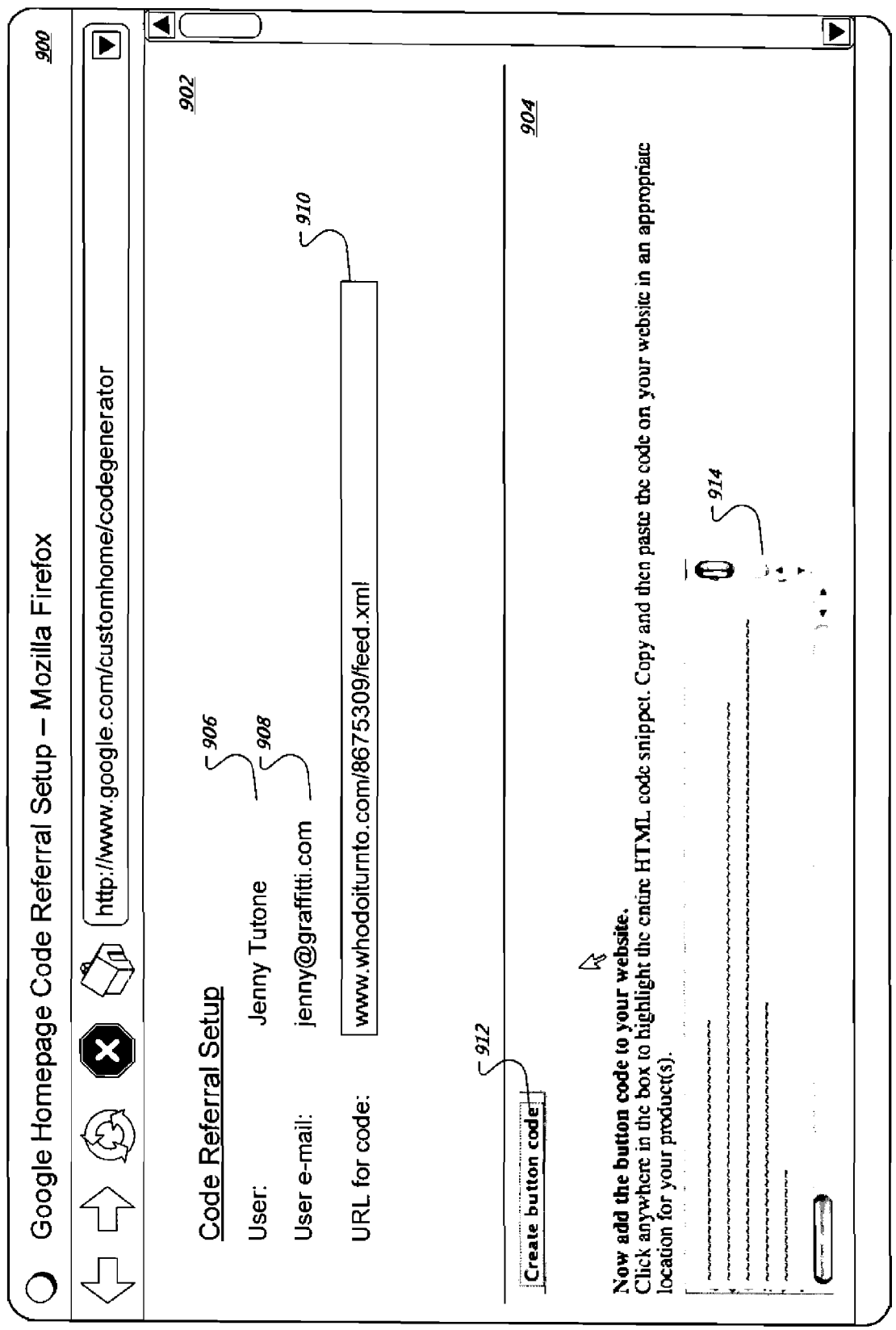
FIG. 9 shows an exemplary screen shot of a display for obtaining a control form a service provider.

FIG. 9 shows an exemplary screen shot of a display 900 for obtaining a control form a service provider. In general, the display shows one way in which a web developer may obtain mark up code to add to their web page that will allow them to associate a feed of content that they generate with a personalized home page of a user. Display 900 generally permits a user to identify a particular feed and then to have mark up code provided to them that generates a button or other similar control that other users may select to have the feed provided on their personalized pages.

Display 900 includes an input area 902 and an output area 904. The input area The input area 902 includes a name field 906 and a user ID field 908, which in this example, is a user's e-mail account. These fields have been pre-populated based on the user's log in with appropriate credentials. A pointer entry box 910 provides a place for the user to identify a location for content that is associated with their web page on which they intend to put their control, and to which they want personalized web pages to point. The pointer may take many various forms, including in forms other than a URL.

The output area 904 may provide custom mark up code, generated using the information entered by the user, to make a button control on a web page. For example, the button may be generated using mark up code that causes a user to be redirected to an information provider when they select the button, and that passes to the information provider certain information associated with the control and with the content that is to be referenced by a module on a personalized page. The information passed to the information provider may include, for example, the associated "URL for code" to direct the personalized page where to obtain code for the module. In addition, parameters for the content may be included, as may other relevant information.

The code in window 914 may represent the mark up code generated for inclusion in a web developer's page. The code, when properly incorporated (e.g., by cutting and pasting), may result in the page displaying a button or similar control whose selection causes a visitor's associated personalized page or pages to receive content associated with the control, such as by the approaches described above.

In addition to the information shown here, the web developer may define other appropriate parameters for the information feed with which the control is to be associated. For example, the developer may identify other objects on the page (such as the route pull down menu 232 on display 230 in FIG. 2) from which variables should be retrieved in establishing information tat should be provided to a user's personalized page.

Figure 10:
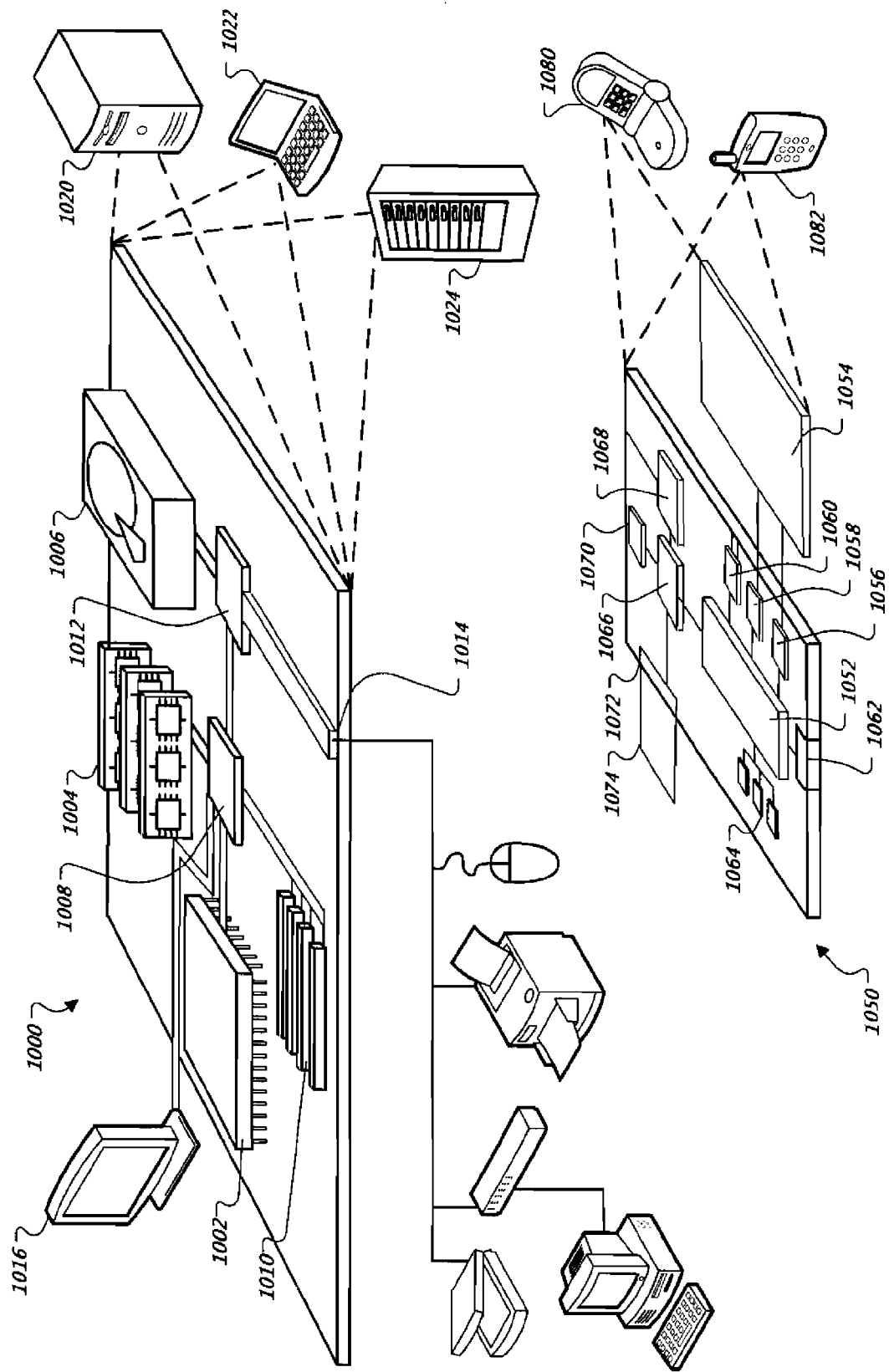
FIG. 10 shows an example of a generic computer device and a generic mobile computer device.

FIG. 10 shows an example of a generic computer device 1000 and a generic mobile computer device 1050, which may be used with the techniques described here. Computing device 1000 is intended to represent various forms of digital computers, such as laptops, desktops, workstations, personal digital assistants, servers, blade servers, mainframes, and other appropriate computers. Computing device 1050 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 1000 includes a processor 1002, memory 1004, a storage device 1006, a high-speed interface 1008 connecting to memory 1004 and high-speed expansion ports 1010, and a low speed interface 1012 connecting to low speed bus 1014 and storage device 1006. Each of the components 1002, 1004, 1006, 1008, 1010, and 1012, are interconnected using various busses, and may be mounted on a common motherboard or in other manners as appropriate. The processor 1002 can process instructions for execution within the computing device 1000, including instructions stored in the memory 1004 or on the storage device 1006 to display graphical information for a GUI on an external input/output device, such as display 1016 coupled to high speed interface 1008. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1004 stores information within the computing device 1000. In one implementation, the memory 1004 is a volatile memory unit or units. In another implementation, the memory 1004 is a non-volatile memory unit or units. The memory 1004 may also be another form of computer-readable medium, such as a magnetic or optical disk.

The storage device 1006 is capable of providing mass storage for the computing device 1000. In one implementation, the storage device 1006 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1004, the storage device 1006, memory on processor 1002, or a propagated signal.

The high speed controller 1008 manages bandwidth-intensive operations for the computing device 1000, while the low speed controller 1012 manages lower bandwidth-intensive operations. Such allocation of functions is exemplary only. In one implementation, the high-speed controller 1008 is coupled to memory 1004, display 1016 (e.g., through a graphics processor or accelerator), and to high-speed expansion ports 1010, which may accept various expansion cards (not shown). In the implementation, low-speed controller 1012 is coupled to storage device 1006 and low-speed expansion port 1014. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1020, or multiple times in a group of such servers. It may also be implemented as part of a rack server system 1024. In addition, it may be implemented in a personal computer such as a laptop computer 1022. Alternatively, components from computing device 1000 may be combined with other components in a mobile device (not shown), such as device 1050. Each of such devices may contain one or more of computing device 1000, 1050, and an entire system may be made up of multiple computing devices 1000, 1050 communicating with each other.

Computing device 1050 includes a processor 1052, memory 1064, an input/output device such as a display 1054, a communication interface 1066, and a transceiver 1068, among other components. The device 1050 may also be provided with a storage device, such as a microdrive or other device, to provide additional storage. Each of the components 1050, 1052, 1064, 1054, 1066, and 1068, are interconnected using various buses, and several of the components may be mounted on a common motherboard or in other manners as appropriate.

The processor 1052 can execute instructions within the computing device 1050, including instructions stored in the memory 1064. The processor may be implemented as a chipset of chips that include separate and multiple analog and digital processors. The processor may provide, for example, for coordination of the other components of the device 1050, such as control of user interfaces, applications run by device 1050, and wireless communication by device 1050.

Processor 1052 may communicate with a user through control interface 1058 and display interface 1056 coupled to a display 1054. The display 1054 may be, for example, a TFT (Thin-Film-Transistor Liquid Crystal Display) display or an OLED (Organic Light Emitting Diode) display, or other appropriate display technology. The display interface 1056 may comprise appropriate circuitry for driving the display 1054 to present graphical and other information to a user. The control interface 1058 may receive commands from a user and convert them for submission to the processor 1052. In addition, an external interface 1062 may be provide in communication with processor 1052, so as to enable near area communication of device 1050 with other devices. External interface 1062 may provide, for example, for wired communication in some implementations, or for wireless communication in other implementations, and multiple interfaces may also be used.

The memory 1064 stores information within the computing device 1050. The memory 1064 can be implemented as one or more of a computer-readable medium or media, a volatile memory unit or units, or a non-volatile memory unit or units. Expansion memory 1074 may also be provided and connected to device 1050 through expansion interface 1072, which may include, for example, a SIMM (Single In Line Memory Module) card interface. Such expansion memory 1074 may provide extra storage space for device 1050, or may also store applications or other information for device 1050. Specifically, expansion memory 1074 may include instructions to carry out or supplement the processes described above, and may include secure information also. Thus, for example, expansion memory 1074 may be provide as a security module for device 1050, and may be programmed with instructions that permit secure use of device 1050. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1064, expansion memory 1074, memory on processor 1052, or a propagated signal that may be received, for example, over transceiver 1068 or external interface 1062.

Device 1050 may communicate wirelessly through communication interface 1066, which may include digital signal processing circuitry where necessary. Communication interface 1066 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1068. In addition, short-range communication may occur, such as using a Bluetooth, WiFi, or other such transceiver (not shown). In addition, GPS (Global Positioning System) receiver module 1070 may provide additional navigation- and location-related wireless data to device 1050, which may be used as appropriate by applications running on device 1050.

Device 1050 may also communicate audibly using audio codec 1060, which may receive spoken information from a user and convert it to usable digital information. Audio codec 1060 may likewise generate audible sound for a user, such as through a speaker, e.g., in a handset of device 1050. Such sound may include sound from voice telephone calls, may include recorded sound (e.g., voice messages, music files, etc.) and may also include sound generated by applications operating on device 1050.

The computing device 1050 may be implemented in a number of different forms, as shown in the figure. For example, it may be implemented as a cellular telephone 1080. It may also be implemented as part of a smartphone 1082, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made. For example, various forms of the flows shown above may be used, with steps re-ordered, added, or removed. Also, although several applications of the payment systems and methods have been described, it should be recognized that numerous other applications are contemplated. Accordingly, other embodiments are within the scope of the following claims.

What is claimed is:

1. A computer-implemented method for coordinating web-based content between networked computing devices, comprising:
   associating an identifier with a first remote device without connecting the identifier to a registered user account;
   receiving from the first remote device a first request to modify a first personalized home page and in response associating the first request with the identifier;
   receiving from the first remote device a second request to modify the first personalized home page and in response associating the second request with the identifier, the second request being different from the first request;
   receiving a log-in from a registered user of the first remote device after receiving the first request and the second request;
   associating, after receiving the log-in, the registered user with the first request and the second request based on the identifier associated with the first remote device;
   modifying the first personalized home page based on the first request and the second request;
   providing the modified first personalized home page for display by the first remote device; prompting the registered user whether to associate the first request and the second request with a display of a second personalized home page by a second remote device; and
   modifying the second personalized home page which is associated with the registered user, wherein the first personalized home page and the second personalized home page share some or all common content.

2. The method of claim 1, wherein the identifier comprises a cookie stored on the first remote device.

3. The method of claim 1, wherein the first personalized home page is associated with a first type of user device, and the second personalized home page is associated with a second type of user device having display capabilities that differ from display capabilities of the first type of user device.

4. The method of claim 1, further comprising receiving a request associated with the registered user to modify the second personalized home page, and making a corresponding modification to the first home page.

5. The method of claim 1, further comprising displaying on a mobile device a plurality of controls whose selection will cause a module of web content to be added to a mobile-related web page associated with the first remote device.

6. The method of claim 5, further comprising selecting the plurality of controls for display according to popularity of each control in a region associated with the first remote device.

7. The method of claim 1, wherein the log-in is received from a full-featured computer and is associated with the first remote device by causing a text message to be sent to the first remote device that directs the first remote device to a server storing the identifier and provides the server with information associated with the registered user.

8. The method of claim 1, further comprising modifying an equivalent home page to the first personalized home page, wherein the equivalent home page contains substantially equivalent topics as the first personalized home page with different formatting.

9. The method of claim 8, wherein the first personalized home page is formatted for display on a mobile device and the equivalent home page is formatted for display on a full-featured computer.

10. The method of claim 9, wherein modifying the equivalent home page comprises creating the equivalent home page and populating it with modules corresponding to modules selected for the first personalized home page.

11. The method of claim 10, further comprising synchronizing content on the first personalized home page with content on the equivalent home page by identifying content that has been added to or deleted from one of the first personalized home page and equivalent home page, and adding or deleting the corresponding content from the other home page.

12. The computer-implemented method of claim 1, further comprising receiving a request from the second remote device to deliver content associated with the first personalized home page, and applying predetermined rules to select content from the first personalized home page to deliver to the second remote device based on identifying the second remote device, before transmitting the selected content to the second remote device.

13. The computer-implemented method of claim 12, wherein the content associated with the first personalized home page comprises a plurality of content modules, and selecting content comprises determining which of the modules has been associated with the identified second remote device.

14. A computer-implemented system, comprising:
a processor;
a web page content database storing associations between session identifiers for devices of unknown users and entries corresponding to personalized web page content for the devices;
a personalized web page database containing code defining web pages for registered users; and
a personalized home page manager, executing on the processor, to (i) associate a registered user with a session identifier upon a log in by the registered user, (ii) associate entries corresponding to personalized web page content with a first personalized web page associated with the registered user, wherein at least two of the entries associated with the registered user are stored before the registered user logs in, to (iii) provide the first personalized web page for display by a first remote computing device, (iv) prompt the registered user whether to associate the at least two entities with a display of a second personalized web page by a second remote computing device, and (v) modify the second personalized web page which is associated with the registered user, wherein the first personalized web page and the second personalized web page share some or all common content.

15. The system of claim 14, wherein the entries corresponding to personalized web page content are generated from messages received from the devices.

16. The system of claim 15, wherein the messages received from the devices are delivered by a browser redirect upon selection by users of the devices of a control for adding content to a personalized page.

17. The system of claim 14, wherein the code defining web pages for registered users comprises code defining two or more corresponding but different pages for each of a plurality of users.

18. The system of claim 17, wherein the personalized home page manager is configured to associate entries corresponding to personalized web page content with the two or more corresponding but different pages for each of a plurality of users.

19. A computer-readable storage device having instructions stored and tangibly embodied thereon that, when executed, cause one or more processing devices to perform operations comprising:
associating an identifier with a first remote device without connecting the identifier to a registered user account;
receiving from the first remote device a first request to modify a first personalized home page and in response associating the first request with the identifier;
receiving from the first remote device a second request to modify the first personalized home page and in response associating the second request with the identifier, the second request being different from the first request;
receiving a log-in from a registered user of the first remote device after receiving the first request and the second request;
associating, after receiving the log-in, the registered user with the first request and the second request based on the identifier associated with the first remote device;
modifying the first personalized home page based on the first request and the second request;
providing the modified first personalized home page for display by the first remote device;
prompting the registered user whether to associate the first request and the second request with a display of a second personalized home page by a second remote device; and
modifying the second personalized home page which is associated with the registered user, wherein the first personalized home page and the second personalized home page share some or all common content.

* * * * *

UNITED STATES PATENT AND TRADEMARK OFFICE
CERTIFICATE OF CORRECTION

| | | |
|---|---|---|
| PATENT NO. | : 8,326,858 B2 | Page 1 of 1 |
| APPLICATION NO. | : 11/624189 | |
| DATED | : December 4, 2012 | |
| INVENTOR(S) | : Jenson et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1231 days.

Signed and Sealed this
Sixteenth Day of December, 2014

Michelle K. Lee
*Deputy Director of the United States Patent and Trademark Office*